(12) United States Patent
Niwa et al.

(10) Patent No.: US 12,237,731 B2
(45) Date of Patent: Feb. 25, 2025

(54) ELECTRIC WORK MACHINE

(71) Applicant: MAKITA CORPORATION, Anjo (JP)

(72) Inventors: Akira Niwa, Anjo (JP); Kei Kouda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 493 days.

(21) Appl. No.: 17/418,088

(22) PCT Filed: Dec. 20, 2019

(86) PCT No.: PCT/JP2019/050174
§ 371 (c)(1),
(2) Date: Jun. 24, 2021

(87) PCT Pub. No.: WO2020/137911
PCT Pub. Date: Jul. 2, 2020

(65) Prior Publication Data
US 2022/0085698 A1    Mar. 17, 2022

(30) Foreign Application Priority Data
Dec. 26, 2018   (JP) .................... 2018-242997

(51) Int. Cl.
*H02K 11/25*     (2016.01)
*B25F 5/02*      (2006.01)
(Continued)

(52) U.S. Cl.
CPC ............. *H02K 11/25* (2016.01); *B25F 5/02* (2013.01); *H02K 3/50* (2013.01); *H02K 5/225* (2013.01); *H02P 29/60* (2016.02)

(58) Field of Classification Search
CPC .......... H02K 3/50; H02K 11/25; H02K 5/225; B25F 5/02
(Continued)

(56) References Cited

U.S. PATENT DOCUMENTS 6,153,954 A  * 11/2000  Uchida ................. H02K 11/25
                                                    310/71
6,756,710 B2 *  6/2004  Bourqui ................ H02K 3/50
                                                    310/43
(Continued)

FOREIGN PATENT DOCUMENTS

CN         1428920 A      7/2003
CN       101682236 A      3/2010
(Continued)

OTHER PUBLICATIONS

Apr. 15, 2023 Office Action issued in Chinese Patent Application No. 201980085728.X.
(Continued)

*Primary Examiner* — Burton S Mullins
(74) *Attorney, Agent, or Firm* — Oliff PLC

(57) ABSTRACT

An electric work machine in one aspect of the present disclosure includes a motor, a driver, and a temperature sensor. The motor includes a stator, and a rotor. The stator includes a cylindrical body, a tooth, and a coil. The cylindrical body includes a first inner circumferential surface. The tooth is disposed to stand on the first inner circumferential surface. The coil is wound around the tooth. The coil generates a magnetic force in response to receiving an electric power. The temperature sensor is installed in/on the tooth.

8 Claims, 22 Drawing Sheets

(51) Int. Cl.
*H02K 3/50* (2006.01)
*H02K 5/22* (2006.01)
*H02P 29/60* (2016.01)

(58) Field of Classification Search
USPC ........................................................ 310/68 C
See application file for complete search history.

(56) References Cited

U.S. PATENT DOCUMENTS

| | | | | |
|---|---|---|---|---|
| 7,356,910 | B2* | 4/2008 | Akutsu | ................ G01D 11/245 |
| | | | | 29/605 |
| 11,404,195 | B2* | 8/2022 | Yamamoto | .......... H01F 27/2876 |
| 2015/0155760 | A1 | 6/2015 | Bessho et al. | |
| 2016/0141941 | A1 | 5/2016 | Yamada et al. | |
| 2016/0226339 | A1* | 8/2016 | Niwa | ...................... H02K 1/27 |
| 2016/0336838 | A1 | 11/2016 | Kouda et al. | |
| 2017/0019001 | A1 | 1/2017 | Budaker et al. | |
| 2018/0138787 | A1 | 5/2018 | Yamagishi et al. | |
| 2018/0205296 | A1 | 7/2018 | Funayama et al. | |

FOREIGN PATENT DOCUMENTS

| | | | |
|---|---|---|---|
| CN | 104682627 | A | 6/2015 |
| CN | 105284035 | A | 1/2016 |
| CN | 106160390 | A | 11/2016 |
| CN | 106357057 | A | 1/2017 |
| CN | 107925298 | A | 4/2018 |
| CN | 108075607 | A | 5/2018 |
| JP | 2003-92858 | A | 3/2003 |
| JP | 3699025 | B2 | 9/2005 |
| JP | 5019960 | B2 | 9/2012 |
| JP | 2015-013327 | A | 1/2015 |
| JP | 2016-140966 | A | 8/2016 |
| JP | 2017-093072 | A | 5/2017 |
| JP | 2018-107889 | A | 7/2018 |
| JP | 2018-121389 | A | 8/2018 |
| WO | 2008141911 | A1 | 11/2008 |
| WO | WO-2009154035 | A1 * | 12/2009 ............. H02K 11/25 |
| WO | WO 2021260789 | A1 * | 12/2021 ........... H02K 11/215 |

OTHER PUBLICATIONS

Mar. 24, 2020 International Search Report issued in International Patent Application No. PCT/JP2019/050174.

Jun. 16, 2021 International Preliminary Report on Patentability issued in International Patent Application No. PCT/JP2019/050174.

Aug. 16, 2022 Office Action issued in Japanese Patent Application No. 2020-563216.

Oct. 31, 2023 Office Action issued in Chinese Patent Application No. 201980085728.X.

* cited by examiner

ELECTRIC WORK MACHINE

CROSS-REFERENCE TO RELATED APPLICATION

This international application claims the benefit of Japanese Patent Application No. 2018-242997, filed on Dec. 26, 2018 in the Japan Patent Office, and the entire disclosure of Japanese Patent Application No. 2018-242997 is incorporated herein by reference.

TECHNICAL FIELD

The present disclosure relates to a technique to install a temperature sensor for detecting a motor temperature in an electric work machine having a motor.

BACKGROUND ART

Patent Document 1 cited below discloses an electric power tool that includes a motor having a temperature sensor. This electric power tool is configured to protect the motor from overloaded operation based on temperatures detected by the temperature sensor.

PRIOR ART DOCUMENTS

Patent Documents

Patent Document 1: Japanese Unexamined Patent Application Publication No. 2015-013327

SUMMARY OF THE INVENTION

Problems to be Solved by the Invention

One part of a motor most likely to generate heat is a coil where an electric current is supplied. Thus, for a proper detection of a motor temperature, it is desirable to install a temperature sensor near the coil.

One conceivable method of installing the temperature sensor near the coil is, for example, to directly fix the temperature sensor on the coil with an adhesive. However, when two or more motors are manufactured, it is not always true that the motors are wound with coils uniformly to one another. It is therefore not easy to stably fix the temperature sensor on the coil.

In one aspect of the present disclosure, it is preferable that a motor temperature of an electric work machine can be properly and stably detected.

Means for Solving the Problems

An electric work machine in one aspect of the present disclosure includes a motor configured to rotate in response to receiving an electric power; a driver; and a temperature sensor. The driver receives a rotational force of the motor. The driver is configured for an attachment of a driven member (operation output member). The driver is configured to drive the driven member attached to the driver with the rotational force of the motor. The driven member is configured to operate on a target of operation in response to being driven by the driver.

The motor includes a stator, and a rotor. The stator includes a cylindrical body (annular member), a tooth, and a coil. The cylindrical body includes a first inner circumferential surface. The tooth is disposed to stand on the first inner circumferential surface. The coil is wound around the tooth. The coil generates a magnetic force in response to receiving an electric power. The temperature sensor is installed in/on the tooth.

In the electric work machine configured as above, the temperature sensor is installed in/on the tooth that is wound with the coil. This enables the temperature sensor to properly and stably detect the temperature of the motor.

The driven member may be configured to be attachable to and detachable from the driver. The target of operation may be any substance. The target of operation may be, for example, various workpieces, various fasteners, plants, dusts, gasses, liquids, and any other substances. The various workpieces may include, for example, woods, metals, and plastics. The various fasteners may include, for example, screws, nails, and nuts. The driven member may operate on the target of operation in any ways. The driven member may operate on a workpiece for example. Specifically, the driven member may operate, for example, to make a hole on the workpiece or to cut or polish the workpiece. The driven member may operate on a fastener for example. Specifically, the driven member may be configured, for example, to operate to rotate the screw thereby to fasten the screw into a fastening target material. The driven member may affect the air surrounding the electric work machine for example. Specifically, the driven member may operate, for example, to provide force to the air surrounding the electric work machine so as to generate airflow. Such airflow may be generated to help discharge the air from the electric work machine for example. Such airflow may be generated to let the air into the electric work machine. The driven member may be configured, for example, to affect a liquid for release or suction of the liquid. The driven member may also affect a plant for example. Specifically, the driven member may be configured, for example, to cut plants such as grasses and small-diameter woods.

The tooth may include a first side surface. The temperature sensor may be installed on the first side surface.

The temperature sensor may be disposed in an area of the first side surface, the area facing outward of the motor in an axial direction, and the axial direction being along a rotational axis of the motor. In the electric work machine configured as above, it becomes easy to install the temperature sensor in the motor, which enables efficient installment of the temperature sensor in the motor.

The temperature sensor may be installed on the first side surface such that the temperature sensor is entirely covered by the coil. The electric work machine configured as above can properly and swiftly transmit a heat generated in the coil to the temperature sensor. Accordingly, the temperature of the motor can be properly and swiftly detected by the temperature sensor.

The stator may include a stator core containing a magnetic substance, and an insulator containing resin. The stator core may include a core tubular body corresponding to a first portion of the cylindrical body, and a core tooth corresponding to a first portion of the tooth. The insulator may include an insulator tubular body corresponding to a second portion of the cylindrical body, and an insulator tooth corresponding to a second part of the tooth. And the temperature sensor may be installed in/on the insulator tooth.

In the stator, including the stator core and the insulator, of the electric work machine configured as above, the temperature sensor is installed in/on the insulator. Accordingly, the temperature sensor can be easily installed in the motor.

The insulator may contain nothing but resin. The insulator may contain resin and an insulating material other than resin.

The insulator may contain nothing but an insulating material other than resin. The insulator may be formed by any method. The insulator may be integrally formed by a molding method such as an injection molding method, for example.

The insulator tubular body may include a second inner circumferential surface corresponding to a part of the first inner circumferential surface. The insulator tooth may include a tooth main body, and an end material. The tooth main body may be disposed to stand on the second inner circumferential surface. The tooth main body may include an end portion protruding towards the rotational axis of the motor. The tooth main body may include a second side surface corresponding to a part of the first side surface. The coil may be wound around the tooth main body. The end material may be disposed in the end portion. The end material may form a flange. The temperature sensor may be installed on the second side surface.

In the electric work machine configured as above, the temperature sensor is installed on the second side surface. This enables an easier installment of the temperature sensor in the motor.

The tooth main body may include a first rib and a second rib. The first rib and the second rib may be disposed to stand on the second side surface. The second rib may face the first rib. In this case, the temperature sensor may be installed on the second side surface between the first rib and the second rib.

In the electric work machine configured as above, the temperature sensor is provided between the first rib and the second rib. This can reduce a pressure applied to the coil.

The first rib and the second rib may extend in a radial direction of the cylindrical body. The first rib may include a first low-wall portion. A height of the first low-wall portion from the second side surface is less than heights of other portions of the first rib. The second rib may include a second low-wall portion. A height of the second low-wall portion from the second side surface is less than heights of other portions of the second rib. The first low-wall portion and the second low-wall portion may be arranged to partially or entirely overlap with each other in a circumferential direction of the cylindrical body. In other words, each of the first rib and the second rib may have a level difference.

In the electric work machine configured as above, winding of the coil around the tooth can start from a position where the first low-wall portion and the second low-wall portion are disposed in an initial stage of the winding work. In this case, the position of the coil at the beginning of the winding can be fixed within a range where the first low-wall portion and the second low-wall portion extend in the radial direction of the cylindrical body. This enables a proper and effective winding of the coil around the tooth.

The tooth main body may include a receiving space disposed on the second side surface. The receiving space may be surrounded by the first rib, the second rib, the end material, and the insulator tubular body. The temperature sensor may be installed in the receiving space. The tooth main body may further include an insulating member. The insulating member may be disposed to partially or entirely cover the temperature sensor in the receiving space.

In the electric work machine configured as above, covering of the temperature sensor with the insulating member can be effectively carried out.

The temperature sensor may be disposed such that the coil contacts the temperature sensor. In the electric work machine configured as above, a heat generated in the coil is more properly and swiftly transmitted to the temperature sensor. This enables more proper and swift detection of the temperature of the motor by the temperature sensor.

The temperature sensor may have a pillar-like shape. In this case, the temperature sensor may extend in the radial direction of the cylindrical body. In the electric work machine configured as above, the number of windings in an area facing the temperature sensor can be increased. This enables to increase accuracy in detection of the temperature of the motor. The temperature sensor may have any specific shape. The temperature sensor may have, for example, a column shape, or a prismatic shape (in other words, a cubical shape or a rectangular solid shape).

The motor may be a brushless motor.

The electric work machine may further include a connection member, and a connection target member. The connection target member may be coupled with the connection member. The connection target member may be configured to be detachable from the connection member. The connection target member may include a first terminal containing metal. The connection member may include a connection main body, a patterned wiring, and a second terminal. The connection main body may include an insulating material. The connection main body may include a surface. The patterned wiring may be disposed on the surface. The patterned wiring may be electrically coupled with the temperature sensor. The second terminal may be disposed on the surface. The second terminal may contain metal. The second terminal may be electrically coupled with the patterned wiring. The second terminal may be in contact with and electrically coupled with the first terminal. The second terminal may be harder and/or thicker than the patterned wiring.

In the electric work machine mentioned above, the electrical coupling (conduction) between the first terminal and the second terminal can be favorably maintained. Accordingly, the electrical coupling between the temperature sensor and the first terminal can also be favorably maintained via the second terminal.

The connection main body may include an integrally-molded member. The second terminal may be integrally provided to the connection main body. A part of the second terminal may be embedded in the connection main body. In such an electric work machine, the second terminal can be properly fixed to the connection main body.

The connection member may be provided to the stator.

The stator may include an insulator containing resin. The connection main body may correspond to a part of the insulator. Such an electric work machine enables the connection member to be effectively disposed with the insulator.

EXPLANATION OF REFERENCE NUMERALS

1 . . . electric work machine; 2 . . . main body; 3 . . . housing; 6 . . . grip; 8 . . . chuck sleeve; 9 . . . trigger operating portion; 12 . . . motor; 13 . . . driving mechanism; 15 . . . controller; 18 . . . temperature sensor; 20 . . . stator; 21 . . . stator back-ring; 22 . . . stator tooth; 23 . . . stator tooth main body; 24 . . . stator tooth end material; 31 . . . first coil; 41 . . . stator core; 42 . . . first insulator; 51 . . . back core; 52 . . . core tooth; 53 . . . core tooth main body; 54 . . . core tooth end material; 61 . . . first back-ring; 62, 120 . . . first tooth; 63, 121 . . . first tooth main body; 64 . . . first tooth end material; 70 . . . receiving space; 72 . . . coating agent; 73, 123 . . . recess; 74, 124 . . . first rib; 74a . . . first low-wall portion; 75, 125 . . . second rib; 75a . . . second low-wall portion; 80, 122 . . . placement surface; 81 . . . first wiring; 82 . . . second wiring; 90 . . . rotor; 91 . . . shaft; 100 . . . battery pack; 101 . . . battery; 111 . . . motor drive circuit; 112 . . . control circuit; 114 . . . temperature detection circuit; 117 . . . trigger switch; 160 . . . center axis; 150 . . . connection member; 155 . . . connection main body; 156 . . . first sensor terminal; 157 . . . second sensor terminal; 161 . . . first arrangement surface; 166 . . . first patterned connection; 167 . . . first patterned wiring; 171 . . . second arrangement surface; 176 . . . second patterned connection; 177 . . . second patterned wiring; 200 . . . connector; 214 . . . fourth connector terminal; 214a . . . first contact; 215 . . . fifth connector terminal; 215a . . . second contact.

MODE FOR CARRYING OUT THE INVENTION

Hereinafter, example embodiments of the present disclosure will be explained with reference to the drawings.

First Embodiment (1-1) Configuration of Electric Work Machine

Figure 1:
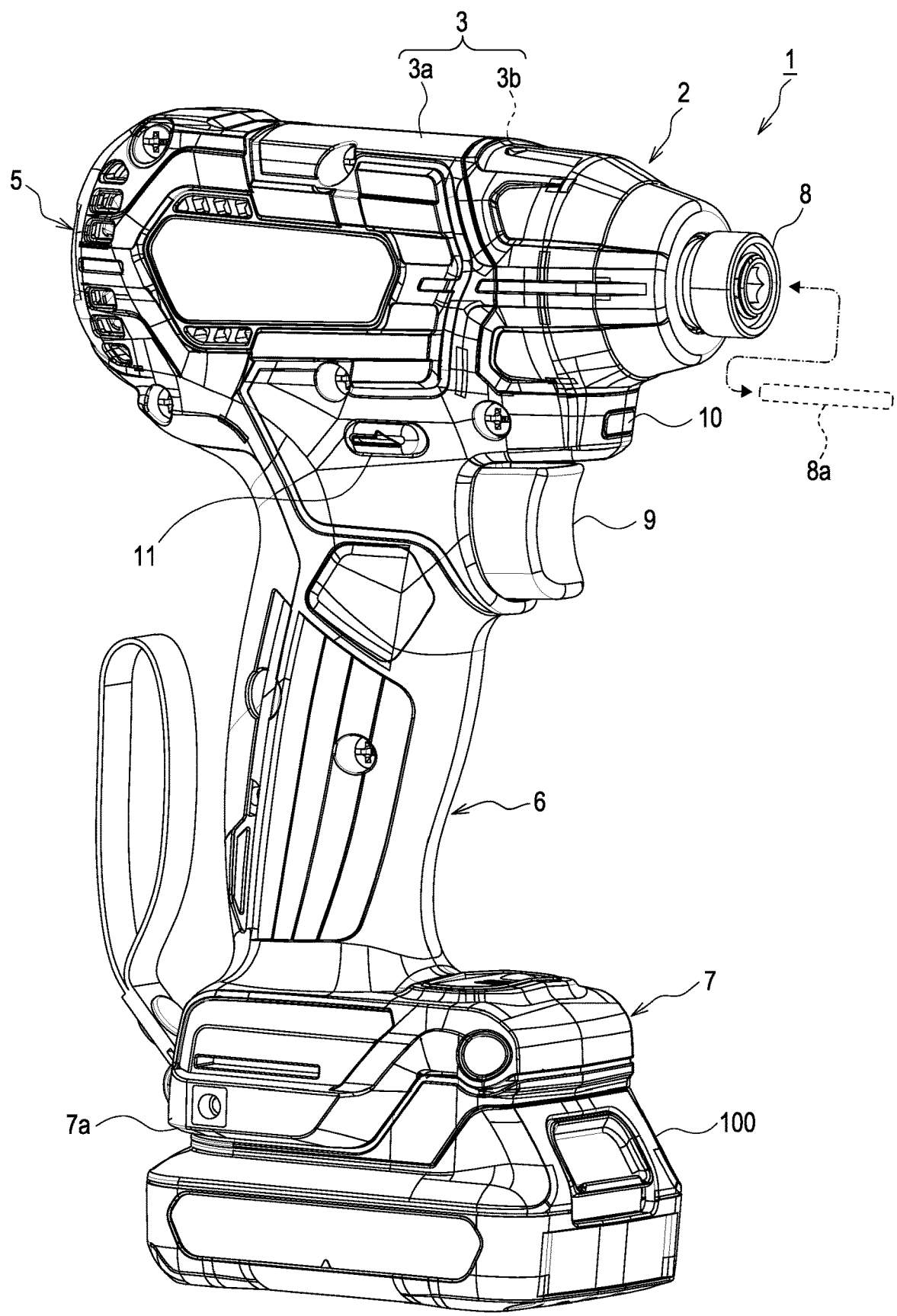
FIG. 1 is a perspective view of an electric work machine in an embodiment.

An electric work machine 1 shown in FIG. 1 is configured as, for example, a rechargeable impact driver. The rechargeable impact driver is operated by electric power supplied from a battery pack 100, which will be mentioned later. The rechargeable impact driver is used, for example, to rotate a fastening member, such as a screw and a bolt, into a target of operation. When rotating the fastening member, the rechargeable impact driver generates hammering in a rotational direction in accordance with a load applied by the fastening member. The rechargeable impact driver can generate a large torque in the rotational direction by the hammering.

As shown in FIG. 1, the electric work machine 1 in the present embodiment includes a main body 2, and the battery pack 100. The battery pack 100 is detachably attached to the main body 2.

The main body 2 includes a housing 3. The housing 3 includes two half housings 3a and 3b, which divide the housing 3 in a right half and a left half. The housing 3 is formed by combining these half housings 3a and 3b. The housing 3 may be, for example, an injection molded member containing resin.

The main body 2 includes a first casing 5, a grip 6, and a second casing 7. The first casing 5 includes a chuck sleeve 8, an LED 10, and a rotational direction switch 11. The LED 10 emits light outward from the electric work machine 1. The grip 6 extends from the first casing 5. The second casing 7 extends from the grip 6. The second casing 7 includes a battery port 7a. The battery pack 100 is detachably attached to the battery port 7a. The battery pack 100 includes a battery 101 (see FIG. 3), which will be mentioned later.

The grip 6 is held by a user of the electric work machine 1. The grip 6 includes a trigger operating portion 9. The user can pull the trigger operating portion 9 while holding the grip 6.

Figure 2:
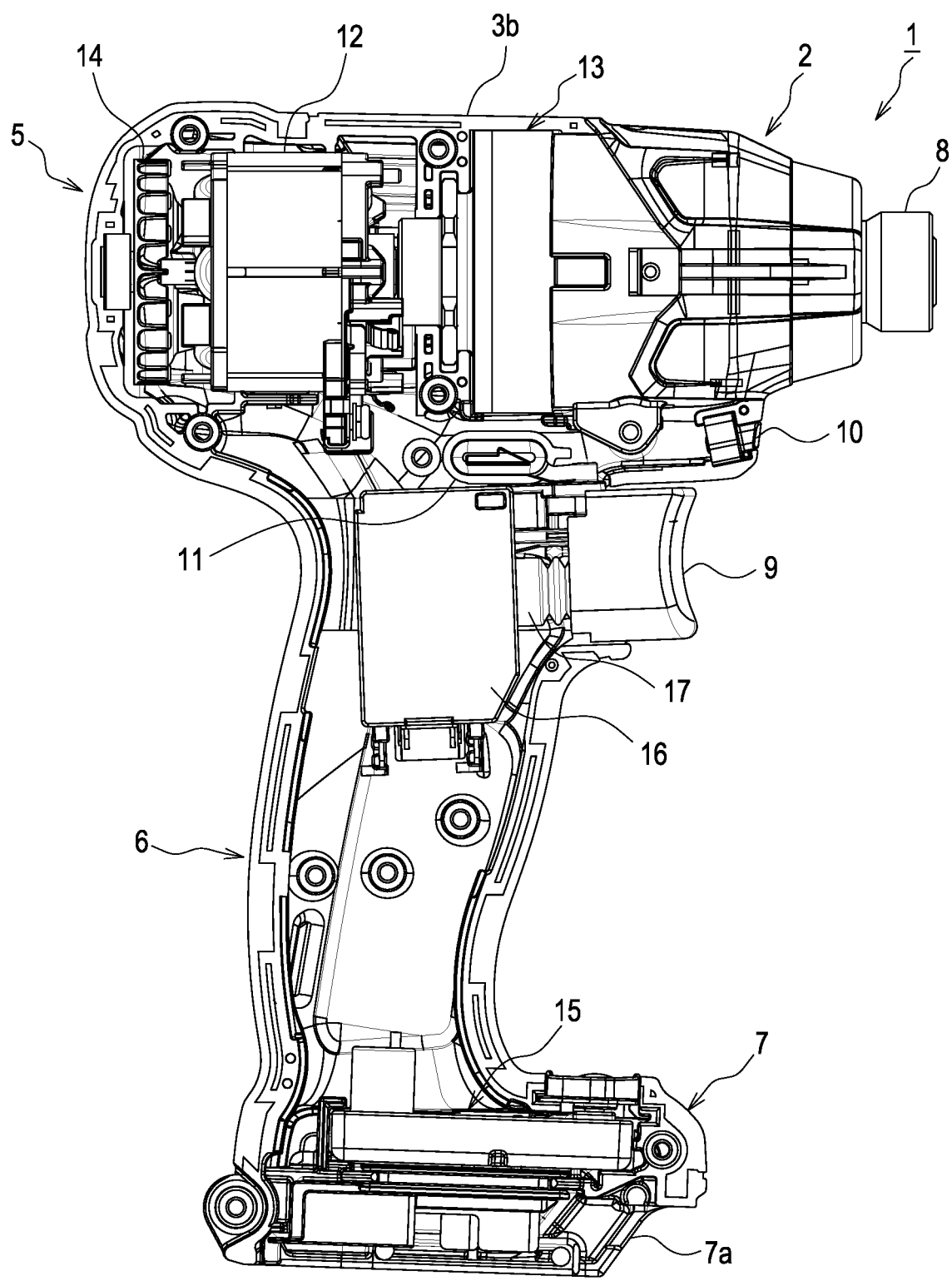
FIG. 2 is a side-surface view showing an internal configuration of the electric work machine in the embodiment.

A configuration inside the main body 2 (that is, inside of the housing 3) will be explained with reference to FIG. 2. FIG. 2 shows the electric work machine 1 with the half housing 3a removed.

As shown in FIG. 2, the first casing 5 includes a motor 12, a driving mechanism 13, a fan 14, the chuck sleeve 8, and the LED 10. Various driven members 8a (members to output operation) are detachably attached to the chuck sleeve 8. These driven members 8a include, for example, a driver bit and a socket bit.

In the present embodiment, the motor 12 is a brushless motor for example. A rotational driving force (rotational force) generated by the motor 12, which is a rotational driving force generated by a rotor 90 (see FIG. 4 etc.) and will be mentioned later, is transmitted to the driving mechanism 13. The driving mechanism 13 includes, for example, unillustrated deceleration mechanism and hammering mechanism. The deceleration mechanism decelerates a rotational speed generated by the rotational driving force transmitted from the motor 12.

The hammering mechanism may include unillustrated spindle, hammer, and anvil. The spindle rotates by the rotational driving force transmitted from the motor 12 via the deceleration mechanism. The hammer rotates with the spindle in response to the rotation of the spindle. The hammer can also move in a direction parallel with a rotational axis of the chuck sleeve 8. The chuck sleeve 8 is attached to the anvil.

In the hammering mechanism, the rotation of the spindle in response to the rotation of the motor 12 causes the anvil to rotate via the hammer. The chuck sleeve 8 (and thus the driven member 8a) rotates in response to the rotation of the anvil. As the operation with the driven member 8a (e.g., screwing to the target of operation) proceeds and an amount of load applied to the anvil exceeds a specific level, hammering is applied to the anvil by the hammer. This hammering is applied in the rotational direction of the chuck sleeve 8 and increases the rotational torque of the chuck sleeve 8.

The rotational driving force of the motor 12 is further transmitted to the fan 14. As the motor 12 rotates, the rotational driving force of the motor 12 causes the fan 14 to rotate. The fan 14 is disposed to cool each element arranged inside of the main body 2 including the motor 12. The rotation of the fan 14 creates air flow in the main body 2, which cools the inside of the main body 2.

The second casing 7 includes a controller 15. The controller 15 executes various functions of the electric work machine 1. The controller 15 is supplied with an electric power in the battery 101 through the battery pack 100 attached to the main body 2. The controller 15 operates with the electric power supplied from the battery 101 (hereinafter, referred to as "battery power").

The grip 6 includes the trigger operating portion 9 mentioned above, a switch box 16, and a plunder 17. The switch box 16 internally includes a trigger switch 117 (see FIG. 3), which will be mentioned later.

The trigger operating portion 9 is coupled with the switch box 16 via the plunder 17. As the user pulls the trigger operating portion 9, the plunder 17 moves in a pull direction along with the trigger operating portion 9. In the present embodiment, this pulling operation means a manipulation to move the trigger operating portion 9 to the left of FIG. 2.

The trigger operating portion 9 is biased in a direction opposite to the pull direction by an unillustrated elastic member. Thus, when not being pulled, the trigger operating portion 9 is positioned at an initial position as shown in FIG. 2. The trigger operating portion 9 moves in the pull direction from the initial position when being pulled.

The trigger switch 117 is turned ON or turned OFF in accordance with the position of the plunder 17. For example, when the trigger operating portion 9 is not pulled, the trigger switch 117 is in an OFF state; and when the trigger operating portion 9 is pulled for a specified amount or more, the trigger switch 117 is turned ON.

(1-2) Electrical Configuration of Electric Work Machine

Figure 3:
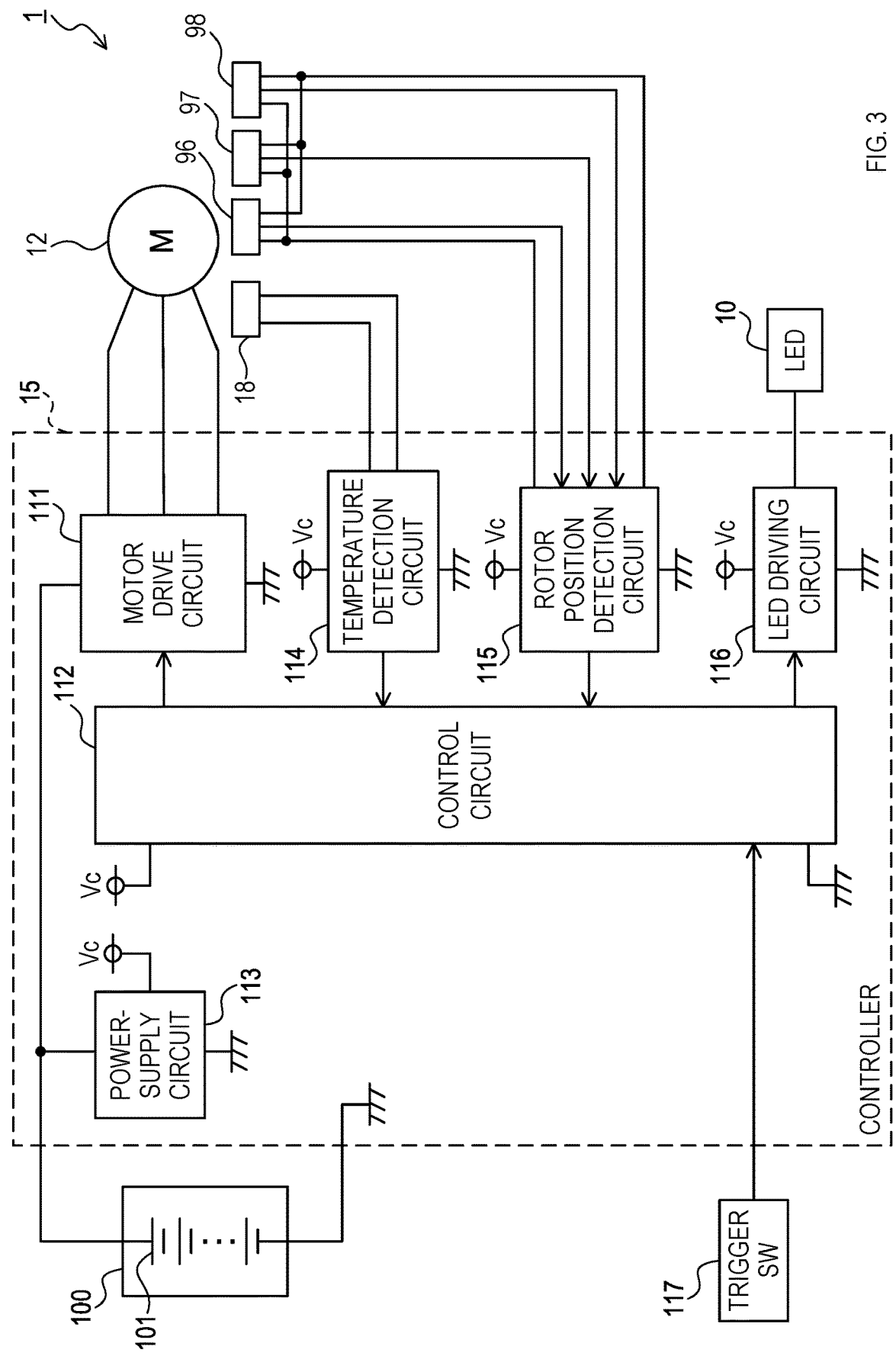
FIG. 3 is a block diagram showing an electrical configuration of the electric work machine in the embodiment.

A supplementary explanation of an electrical configuration of the electric work machine 1 will be given below with reference to FIG. 3. FIG. 3 shows the electrical configuration of the electric work machine 1 with the battery pack 100 attached to the main body 2. As shown in FIG. 3, the electric work machine 1 includes the motor 12, the controller 15, the LED 10, a temperature sensor 18, three rotation sensors 96, 97, 98, the trigger switch 117, and the battery pack 100. The motor 12, the LED 10, the temperature sensor 18, the three rotation sensors 96, 97, 98, and the trigger switch 117 are coupled with the controller 15.

The battery pack 100 includes the battery 101. The battery 101 is, for example, a rechargeable battery. The battery 101 may be a lithium-ion battery, for example. The battery 101 may also be a rechargeable battery different from a lithium-ion battery, for example.

The temperature sensor 18 is installed in the motor 12. The temperature sensor 18 detects a temperature of the motor 12. In the present embodiment, the temperature sensor 18 is situated in a vicinity of a first coil 31 (see FIG. 4), which will be mentioned later, so as to accurately detect a temperature of the first coil 31 in particular. An installation location of the temperature sensor 18 in the motor 12 will be explained later in detail.

Electrical properties of the temperature sensor 18 vary according to the temperature. The temperature sensor 18 is configured to output a temperature-detection signal in accordance with the variations in its electrical properties. In the present embodiment, the temperature sensor 18 is, for example, a thermistor. The temperature sensor 18 may be a negative temperature coefficient (NTC) thermistor, for example.

The rotation sensors 96, 97, 98 are disposed in the motor 12 to detect a rotational position of the rotor 90. More specifically, the rotation sensors 96, 97, 98 are arranged about the rotational axis of the rotor 90 in the rotational direction of the rotor 90; each sensor is separate from one another by an angle corresponding to an electrical angle of 120 degrees. Each of the rotation sensors 96, 97, 98 outputs a rotation detection signal corresponding to the rotational position of the rotor 90. In the present embodiment, each of the rotation sensors 96, 97, 98 includes a Hall element, for example.

The controller 15 includes a motor drive circuit 111, a control circuit 112, a power-supply circuit 113, a temperature detection circuit 114, a rotor position detection circuit 115, and an LED driving circuit 116.

The motor drive circuit 111 converts the battery power to U-phase drive current, V-phase drive current, and W-phase drive current in accordance with a motor drive command. The motor drive command is delivered from the control circuit 112. The motor drive circuit 111 outputs the U-phase drive current, the V-phase drive current, and the W-phase drive current to the motor 12. The motor 12 is driven by the U-phase drive current, the V-phase drive current, and the W-phase drive current.

The power-supply circuit 113 generates a power-supply power from the battery power and outputs the power-supply power. The power-supply power has a constant power-supply voltage Vc. Each element in the controller 15 is operated with the power-supply power. The control circuit 112, the temperature detection circuit 114, the rotor position detection circuit 115, and the LED driving circuit 116 are operated with the power-supply power.

The temperature detection circuit 114 detects the temperature of the motor 12 based on the temperature-detection signal received from the temperature sensor 18. The temperature detection circuit 114 outputs a signal that indicates the detected temperature to the control circuit 112.

In the present embodiment, the temperature detection circuit 114 may include a resistor coupled in series with the temperature sensor 18, for example. The temperature detection circuit 114 may be configured to apply the power-supply voltage Vc to a series circuit that includes the temperature sensor 18 and the resistor. The temperature-detection signal may be a voltage at a point of connection of the temperature sensor 18 with the resistor.

The rotor position detection circuit 115 supplies the power-supply voltage to the rotation sensors 96, 97, 98 thereby to operate the rotation sensors 96, 97, 98. The rotor position detection circuit 115 receives the rotation detection signal from each of the rotation sensors 96, 97, 98. The rotor position detection circuit 115 detects the rotational position of the rotor 90 based on the rotation detection signal received from the rotation sensors 96, 97, 98. The rotor position detection circuit 115 outputs a signal indicating the detected rotational position to the control circuit 112.

The LED driving circuit 116 supplies the power-supply power to the LED 10 in accordance with an LED drive command received from the control circuit 112 thereby to turn on the LED 10.

The control circuit 112 may include, for example, an unillustrated CPU and memory. Various functions of the electric work machine 1 may each be achieved by the CPU executing various programs stored in the memory.

The control circuit 112 receives a trigger signal from the trigger switch 117. The trigger signal indicates ON or OFF of the trigger switch 117. Once the trigger switch 117 is turned ON, the control circuit 112 delivers the motor drive command to the motor drive circuit 111 thereby to drive the motor 12.

The control circuit 112 may receive an operation amount signal that indicates a pull-operation amount of the trigger operating portion 9. In this case, the control circuit 112 may output the motor drive command in accordance with the operation amount signal (in other words, in accordance with the pull-operation amount). To output the motor drive command in accordance with the operation amount signal means to change drive parameters of the motor 12 (for example, a rotational torque and a rotational speed) in accordance with the pull-operation amount.

When driving the motor 12, the control circuit 112 refers to the signal the rotor position detection circuit 115 delivers and outputs the motor drive command corresponding to the rotational position of the rotor 90. The control circuit 112 monitors the temperature of the motor 12 based on the signal received from the temperature detection circuit 114. The control circuit 112 executes a protection process corresponding to the temperature of the motor 12. The protection process may include, for example, a process to reduce the rotational speed of the motor 12 or to stop the rotation of the motor 12 in a case the temperature of the motor 12 reaches or exceeds a given temperature.

(1-3) Detailed Configuration of Motor

Figure 4:
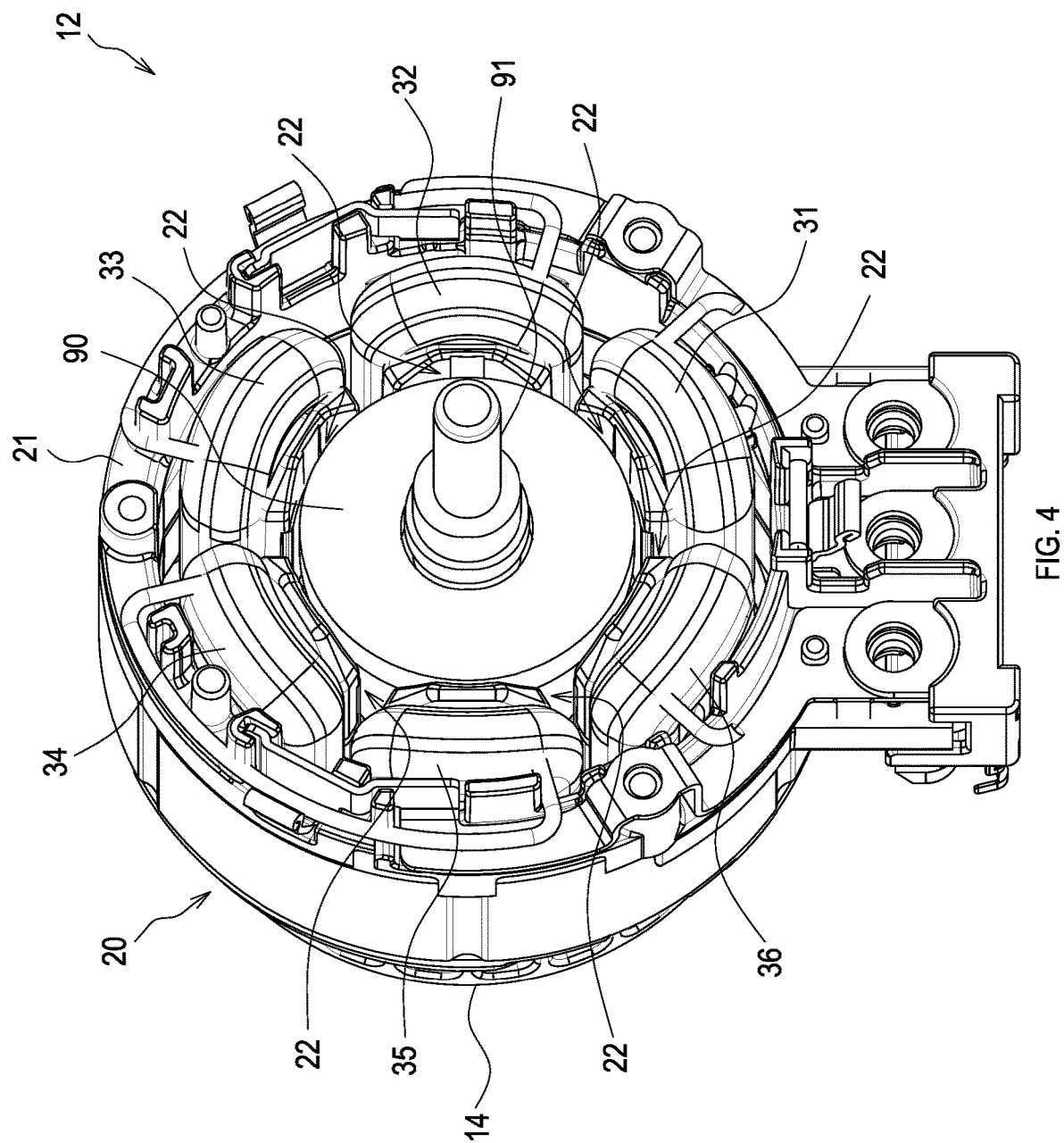
FIG. 4 is a perspective view of a motor in the embodiment.
Figure 5:
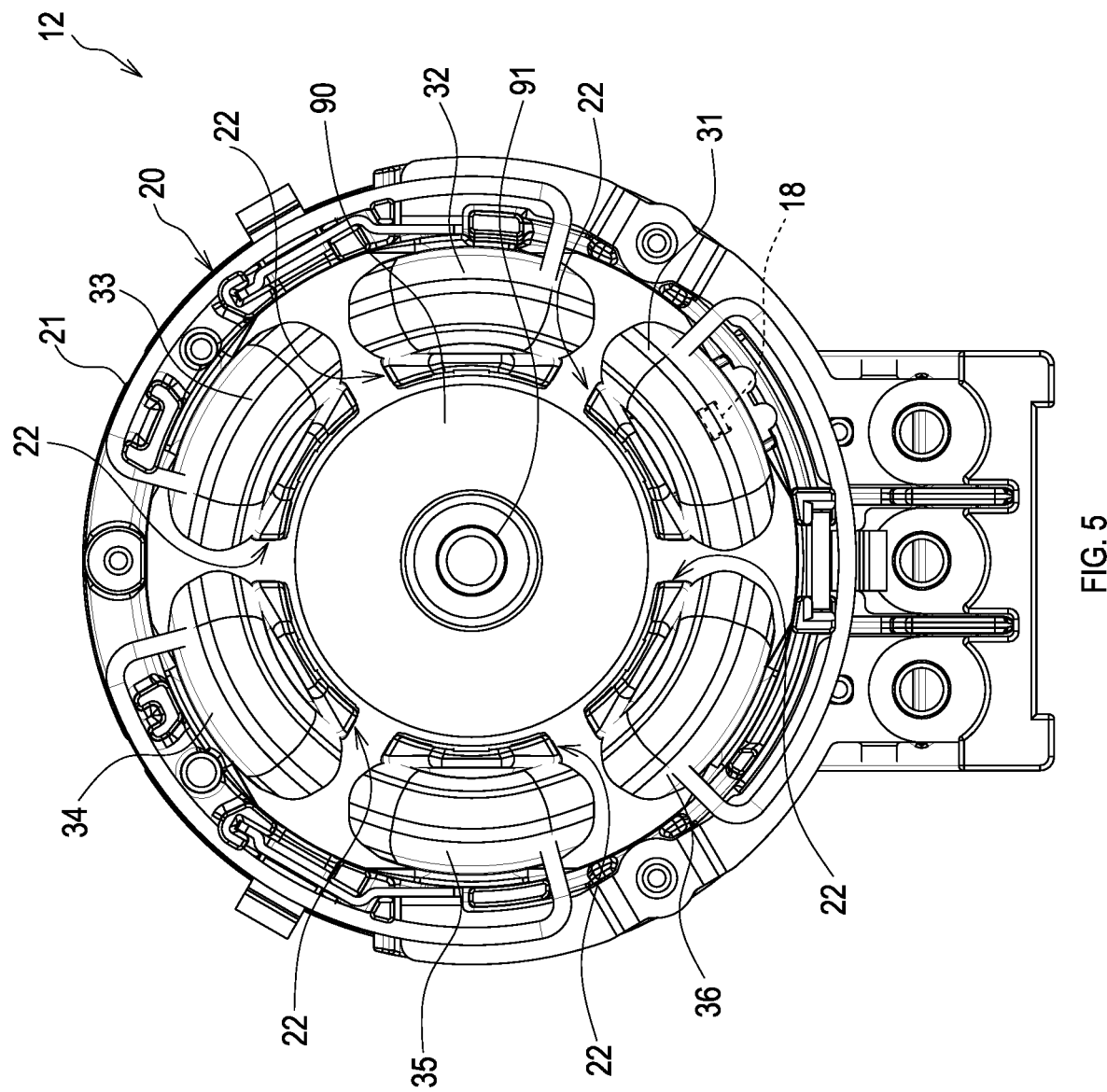
FIG. 5 is a front view of the motor in the embodiment.

More detailed configuration of the motor 12 will be given below with reference to FIG. 4 to FIG. 6. As shown in FIG. 4 and FIG. 5, the motor 12 includes a stator 20 and the rotor 90. FIG. 4 describes the fan 14 that is rotated by the motor 12.

As it is obvious from the positional relationship between the motor 12 and the fan 14 in FIG. 4, FIG. 4 is a view of the motor 12 taken from a side where the driving mechanism 13 is disposed, which is opposite to the side where the fan 14 is disposed.

The stator 20 includes a stator back-ring 21 and six stator teeth 22. The stator 20 further includes a first phase coil, a second phase coil, and a third phase coil. More specifically, the stator 20 includes a first coil 31, a second coil 32, a third coil 33, a fourth coil 34, a fifth coil 35, and a sixth coil 36. The first phase coil includes any two coils among the first coil 31 to the sixth coil 36. Those two coils in the first phase coil are coupled in series with each other.

The second phase coil includes any two coils among the first coil 31 to the sixth coil 36 but distinct from those in the first phase coil. Those two coils in the second phase coil are coupled in series with each other.

The third phase coil includes any two coils among the first coil 31 to the sixth coil 36 but distinct from those in the first phase coil and the second phase coil. Those two coils in the third phase coil are coupled in series with each other.

Figure 6:
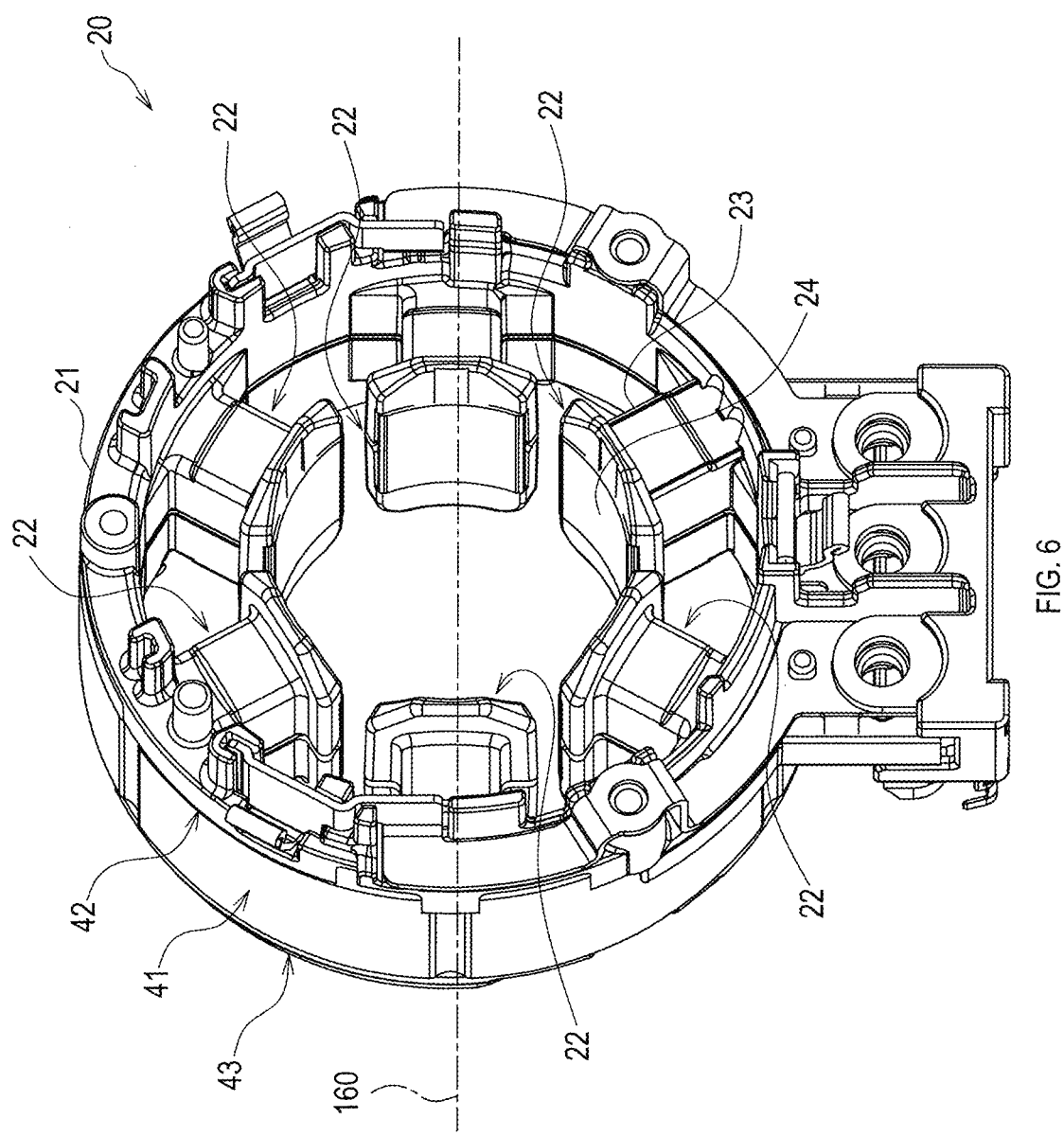
FIG. 6 is a perspective view of a stator with a coil removed.

As shown in FIG. 4 to FIG. 6, the stator back-ring 21 has a ring-shape (for example, a cylindrical shape with both ends open). The six stator teeth 22 are arranged on an inner circumferential surface of the stator back-ring 21 and apart from one another with equal intervals (for example, every 60 degrees) in a circumferential direction of the stator back-ring 21.

As shown in FIG. 6, each stator tooth 22 is disposed on the inner circumferential surface of the stator back-ring 21 to protrude towards a center axis 160 of the stator back-ring 21 (in other words, in a radial direction of the stator back-ring 21).

A center axis 160 is the same as the rotational axis of the rotor 90, and thus is the same as a rotational axis of a shaft 91.

As shown in FIG. 6, each stator tooth 22 includes a stator tooth main body 23 and a stator tooth end material 24. The stator tooth main body 23 stands on the inner circumferential surface of the stator back-ring 21 to protrude towards the center axis 160 of the stator back-ring 21. The stator tooth end material 24 is situated on an end portion of the stator tooth main body 23 that protrudes towards the center axis 160.

An area of a section of the stator tooth end material 24 perpendicular to the radial direction is larger than an area of a section of the stator tooth main body 23 perpendicular to the radial direction. In other words, the stator tooth end material 24 is disposed to form a flange on the stator tooth main body 23.

As shown in FIG. 4 and FIG. 5, the first coil 31 to the sixth coil 36 are each disposed on a different one of the stator teeth 22. More specifically, the first coil 31 to the sixth coil 36 are each wound around the stator tooth main body 23 of the corresponding stator tooth 22.

In the present embodiment, the first phase coil, the second phase coil, and the third phase coil are connected in a delta configuration, for example. In other words, a first end of the first phase coil is coupled with a first end of the second phase coil and also with the motor drive circuit 111. The first end of the first phase coil is supplied with, for example, the aforementioned U-phase drive current from the motor drive circuit 111.

A second end of the first phase coil is coupled with a first end of the third phase coil and also with the motor drive circuit 111. The second end of the first phase coil is supplied with, for example, the aforementioned V-phase drive current from the motor drive circuit 111.

A second end of the second phase coil is coupled with a second end of the third phase coil and also with the motor drive circuit 111. The second end of the second phase coil is supplied with, for example, the aforementioned W-phase drive current from the motor drive circuit 111.

In the present embodiment, for example, the first coil 31 and the fourth coil 34 are coupled in series with each other, and included in the first phase coil. For example, the second coil 32 and the fifth coil 35 are coupled in series with each other, and included in the second phase coil. For example, the third coil 33 and the sixth coil 36 are coupled in series with each other, and included in the third phase coil.

The first phase coil, the second phase coil, and the third phase coil may be coupled with one another in a connection different from the delta configuration (for example, a star configuration).

The rotor 90 is a so-called permanent magnet rotor having an internally mounted permanent magnet. The rotor 90 rotates in response to a supply of an electric power from the controller 15 to the stator 20. The supply of an electric power to the stator 20 means that at least one of the aforementioned U-phase drive current, V-phase drive current, or W-phase drive current is supplied to the stator 20.

As shown in FIG. 4 and FIG. 5, the rotor 90 includes the shaft 91. The shaft 91 rotates integrally with the rotor 90. The shaft 91 is linked to the driving mechanism 13. The rotational driving force of the rotor 90 is transmitted to the driving mechanism 13 via the shaft 91.

The temperature sensor 18 is installed in/on one of the six stator teeth 22. In the present embodiment, as shown in FIG. 5 for example, the temperature sensor 18 is installed in one stator tooth 22 wound with the first coil 31. Hereinafter, the stator tooth 22 in which the temperature sensor 18 is installed is referred to as "sensor-installed tooth 22".

As the sensor-installed tooth 22 includes the temperature sensor 18, its configuration is partially different from other five stator teeth 22. In the present embodiment, the five stator teeth 22 other than the sensor-installed tooth 22 have a same configuration.

The temperature sensor 18 is installed in the stator tooth main body 23 of the sensor-installed tooth 22, more detail of which will be explained later with reference to FIG. 8 to FIG. 13. As shown in FIG. 5, in a front view of the motor 12, in other words, in a view of the motor 12 from its side where the driving mechanism 13 is installed along the center axis 160, the temperature sensor 18 entirely and completely overlaps with the first coil 31. In other words, the entire temperature sensor 18 is covered by the first coil 31.

As shown in FIG. 6, in the present embodiment, the stator 20 includes a stator core 41, a first insulator 42, and a second insulator 43. The stator back-ring 21, and the six stator teeth 22 are formed of the first insulator 42, the stator core 41, and the second insulator 43 combined in this order.

Figure 7:
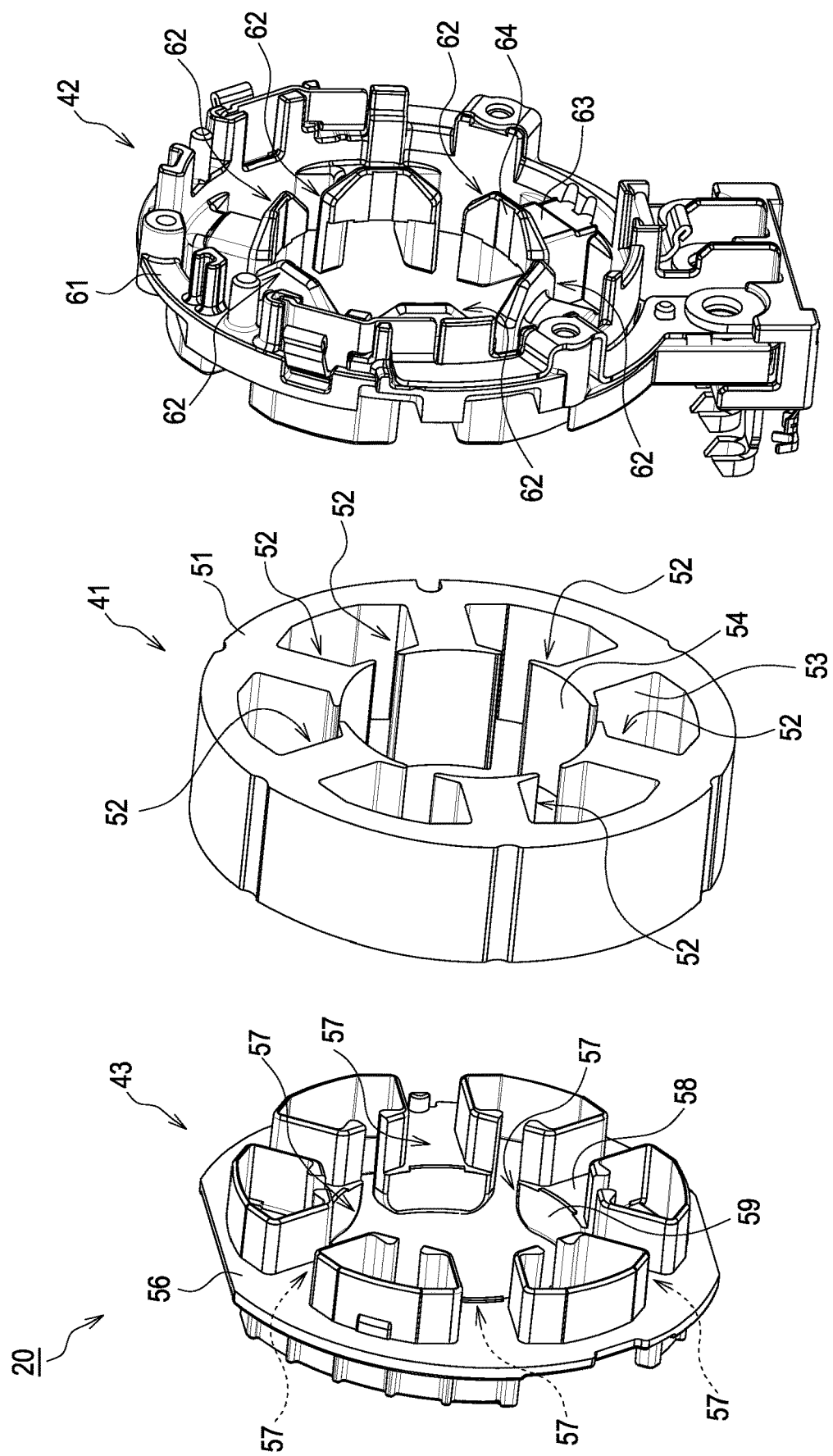
FIG. 7 is an exploded perspective view of the stator with the coil removed.

With reference to FIG. 7, the stator core 41, the first insulator 42, and the second insulator 43 will be explained more specifically.

The stator core 41 contains a magnetic substance. The stator core 41 includes a back core 51 and six core teeth 52. The back core 51 is a part of the stator back-ring 21. A core tooth 52 is a part of the stator tooth 22.

The back core 51 has a ring-shape (for example, a cylindrical shape with both ends open). The six core teeth 52 are arranged on an inner circumferential surface of the back core 51 and apart from one another with equal intervals (for example, every 60 degrees) in a circumferential direction of the back core 51. Each core tooth 52 is disposed on the inner circumferential surface of the back core 51 to protrude towards a center axis of the back core 51 (that is, the aforementioned center axis 160).

Each core tooth 52 includes a core tooth main body 53 and a core tooth end material 54. The core tooth main body 53 is a part of the stator tooth main body 23. The core tooth end material 54 is a part of the stator tooth end material 24.

The first insulator 42 and the second insulator 43 contain an insulating material. More specifically, in the present embodiment, the first insulator 42 and the second insulator 43 contain a material including resin as a primary component.

In the present embodiment, the first insulator 42 and the second insulator 43 are, for example, resin-molded members integrally molded from a material containing resin. The first insulator 42 and the second insulator 43 may contain, for example, thermosetting resin. The first insulator 42 and the second insulator 43 may contain, for example, thermoplastic resin. The first insulator 42 and the second insulator 43 may contain, for example, nothing but resin. The first insulator 42 and the second insulator 43 may contain, for example, resin and an insulating material other than resin. The first insulator 42 and the second insulator 43 may contain, for example, nothing but an insulating material other than resin.

The first insulator 42 and the second insulator 43 may be formed by any method. The first insulator 42 and the second insulator 43 may be formed by, for example, an injection molding method. The first insulator 42 and the second insulator 43 may be formed by a method different from the injection molding method. The first insulator 42 and the second insulator 43 may be formed of the same material, or may be formed of different materials.

As shown in FIG. 7, the first insulator 42 includes a first back-ring 61 and six first teeth 62. The first back-ring 61 is a part of the stator back-ring 21. A first tooth 62 is a part of the stator tooth 22.

The first back-ring 61 has a ring-shape (for example, a cylindrical shape with both ends open). The six first teeth 62 are arranged on an inner circumferential surface of the first back-ring 61 and apart from one another with equal intervals (for example, every 60 degrees) in a circumferential direction of the first back-ring 61. Each first tooth 62 is disposed on the inner circumferential surface of the first back-ring 61 to protrude towards a center axis of the first back-ring 61 (that is, the aforementioned center axis 160).

Each first tooth 62 includes a first tooth main body 63 and a first tooth end material 64. The first tooth main body 63 is a part of the stator tooth main body 23. One of the first coil 31 to the sixth coil 36 is allocated and wound around the first tooth main body 63. The first tooth end material 64 is a part of the stator tooth end material 24.

The temperature sensor 18 is installed in one of the six first teeth 62. Hereinafter, the first tooth 62 in which the temperature sensor 18 is installed is referred to as a "first sensor-installed tooth 62". The first coil 31 is wound around the first sensor-installed tooth 62.

As the first sensor-installed tooth 62 includes the temperature sensor 18, its configuration is partially different from other five first teeth 62. In the present embodiment, the five first teeth 62 other than the first sensor-installed tooth 62 have a same configuration.

As shown in FIG. 7, the second insulator 43 includes a second back-ring 56 and six second teeth 57. The second back-ring 56 is a part of the stator back-ring 21. A second tooth 57 is a part of the stator tooth 22.

The second back-ring 56 has a ring-shape (for example, a circular ring-shape). The six second teeth 57 are arranged on a surface of the second back-ring 56 and apart from each other with equal intervals (for example, every 60 degrees) in a circumferential direction of the second back-ring 56. Each second tooth 57 is disposed on the surface of the second back-ring 56 towards a center axis of the second back-ring 56 (that is, the aforementioned center axis 160).

Each second tooth 57 includes a second tooth main body 58 and a second tooth end material 59. The second tooth main body 58 is a part of the stator tooth main body 23. The second tooth end material 59 is a part of the stator tooth end material 24.

As shown in FIG. 6 and FIG. 7, one stator tooth 22 of the stator 20 is formed by combining one core tooth 52, one first tooth 62 corresponding to the one core tooth 52, and one second tooth 57 corresponding to the one core tooth 52.

(1-4) Configuration of First Sensor-Installed Tooth

More detailed description of the first sensor-installed tooth 62 of the first insulator 42 will be given below with reference to FIG. 8 to FIG. 13.

Figure 8:
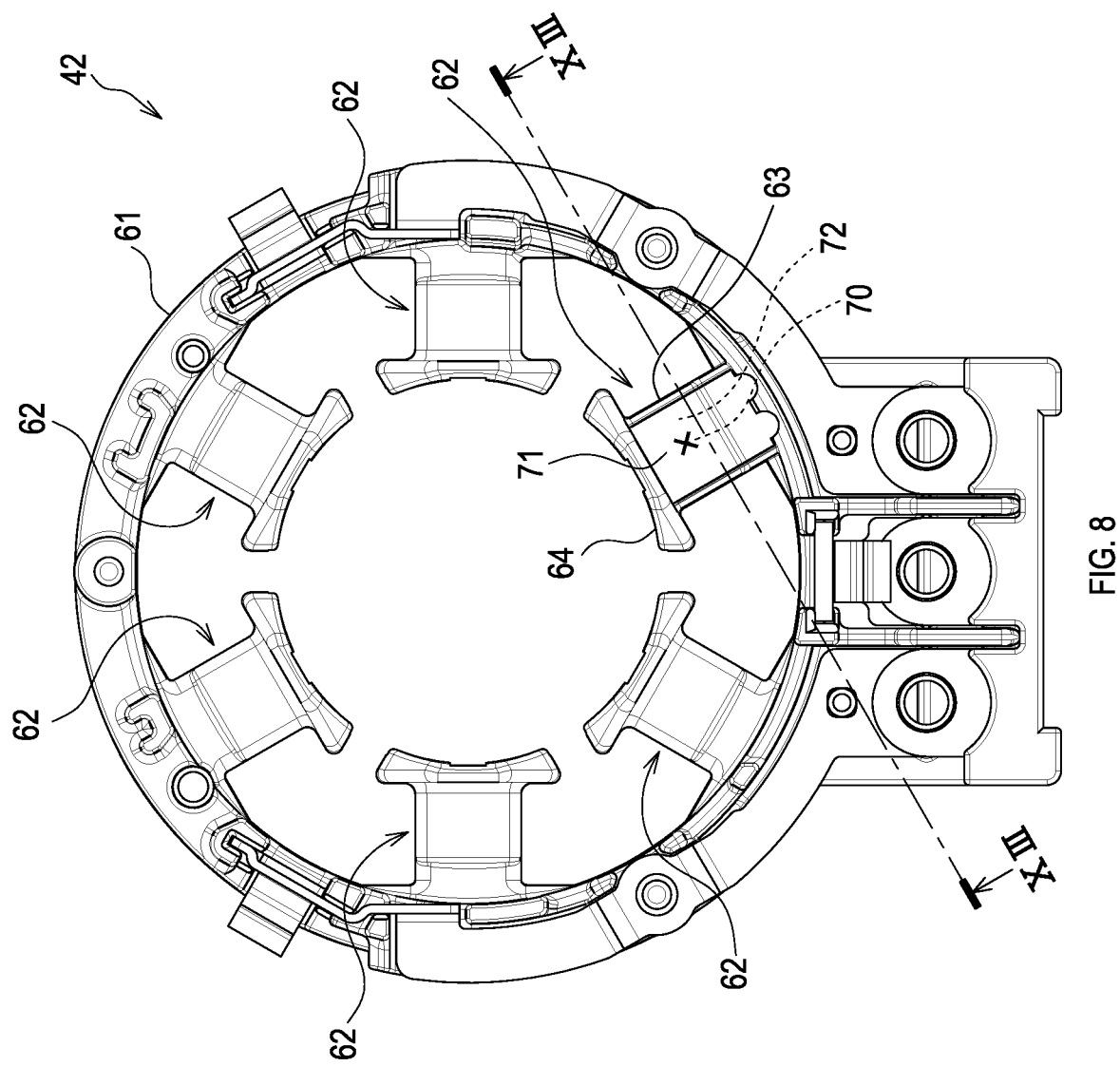
FIG. 8 is a front view of a first insulator.
Figure 9:
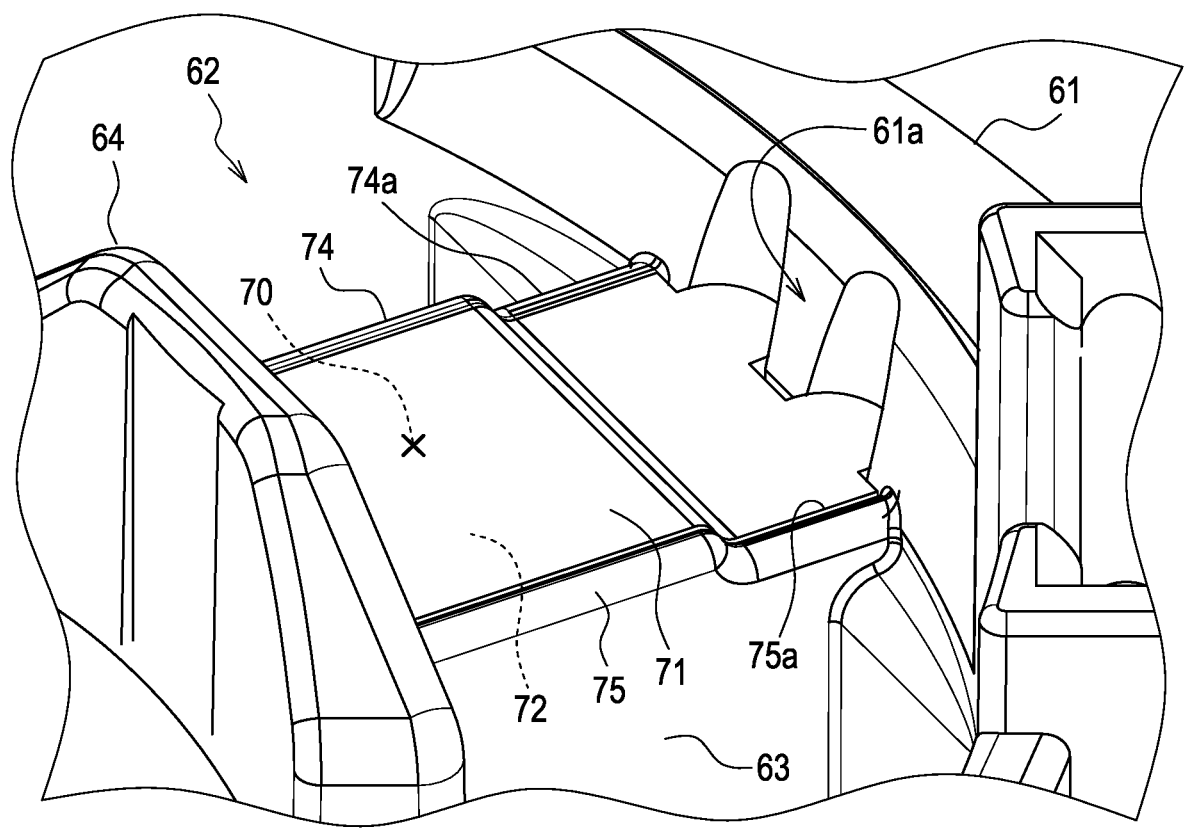
FIG. 9 is a perspective view of a first sensor-installed tooth and its vicinity.
Figure 10:
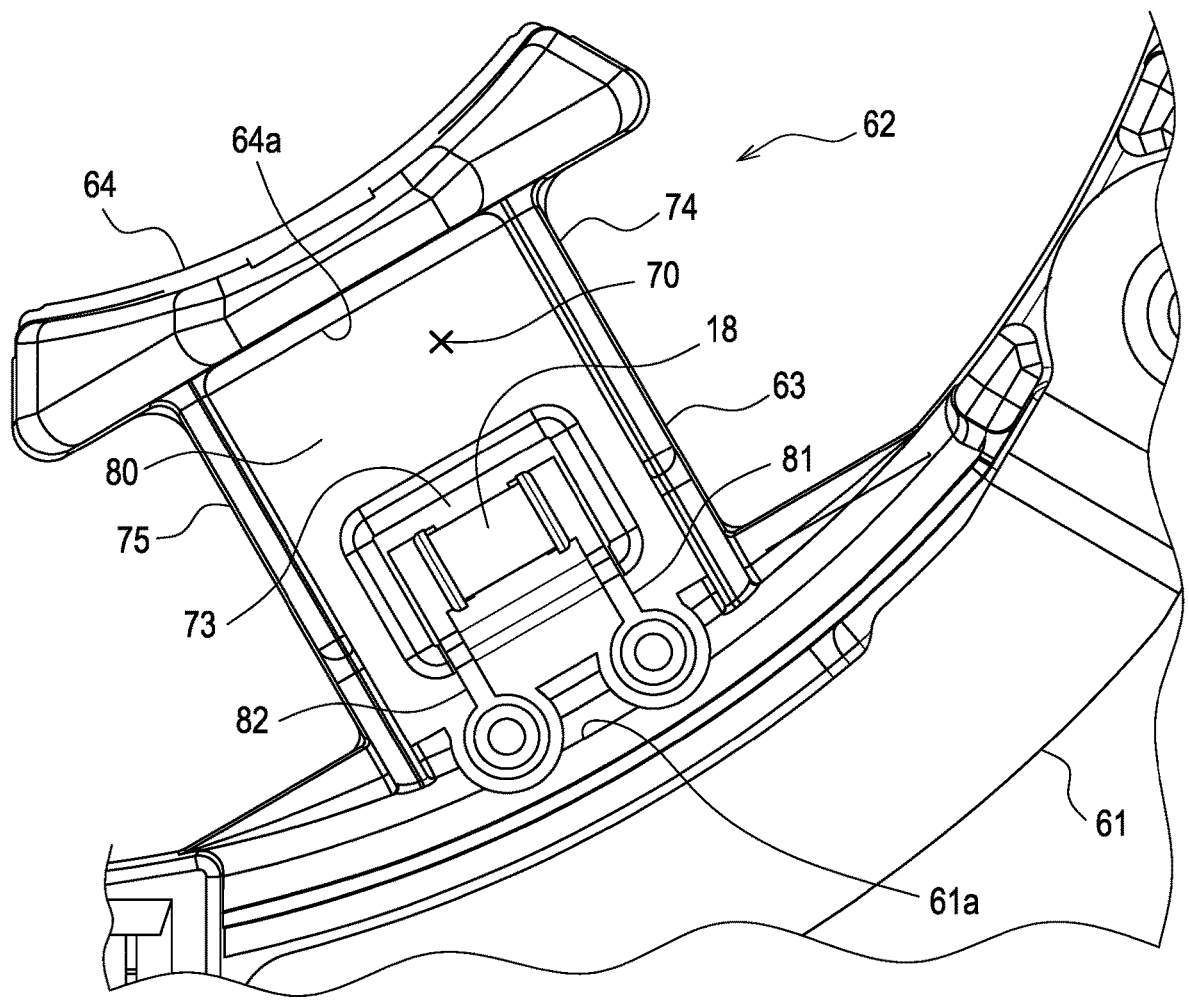
FIG. 10 is a front view of the first sensor-installed tooth and its vicinity.
Figure 11:
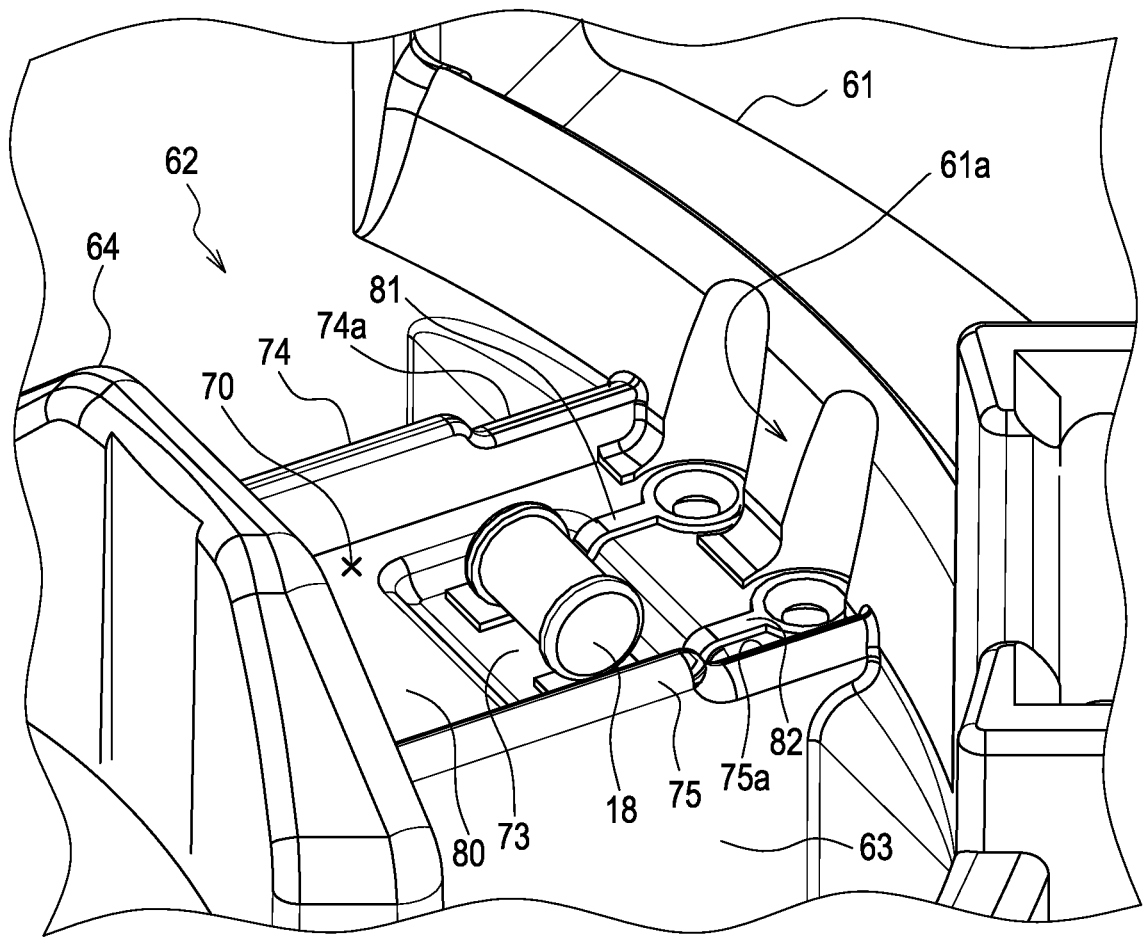
FIG. 11 is a first perspective view of the first sensor-installed tooth with a cover and a coating agent removed, and its vicinity.
Figure 12:
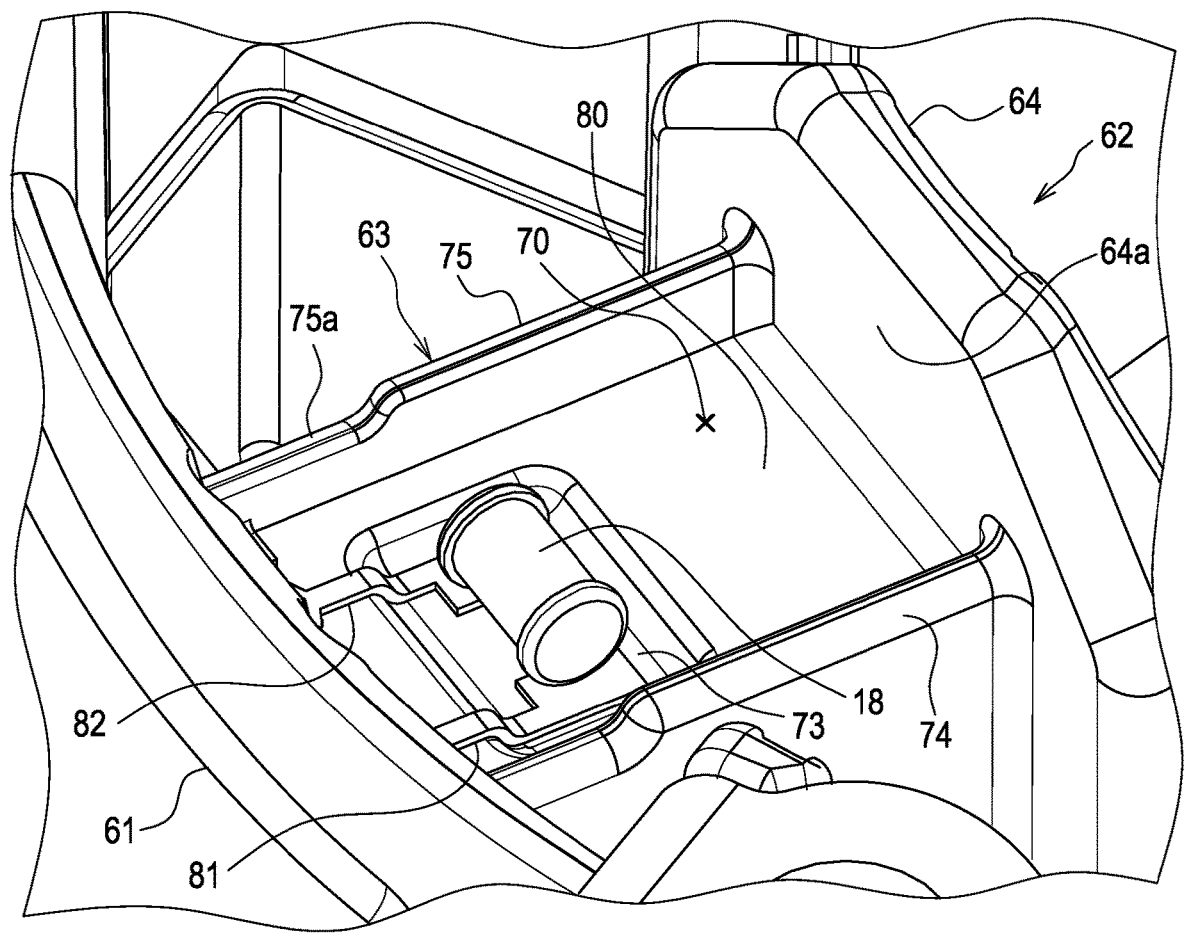
FIG. 12 is a second perspective view of the first sensor-installed tooth with the cover and the coating agent removed, and its vicinity.
Figure 13:
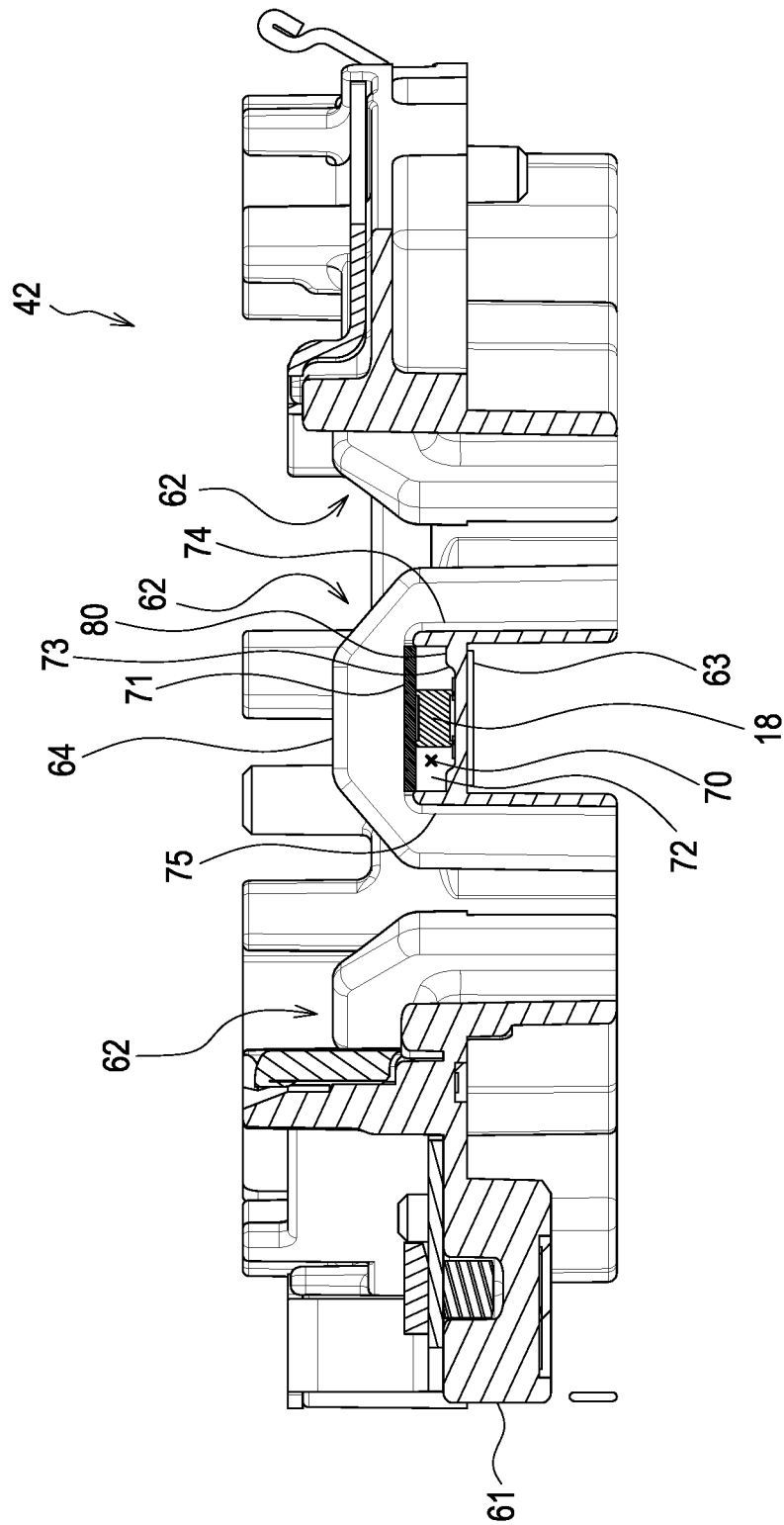
FIG. 13 is a cross-sectional view taken along line XIII-XIII in FIG. 8.
Figure 14:
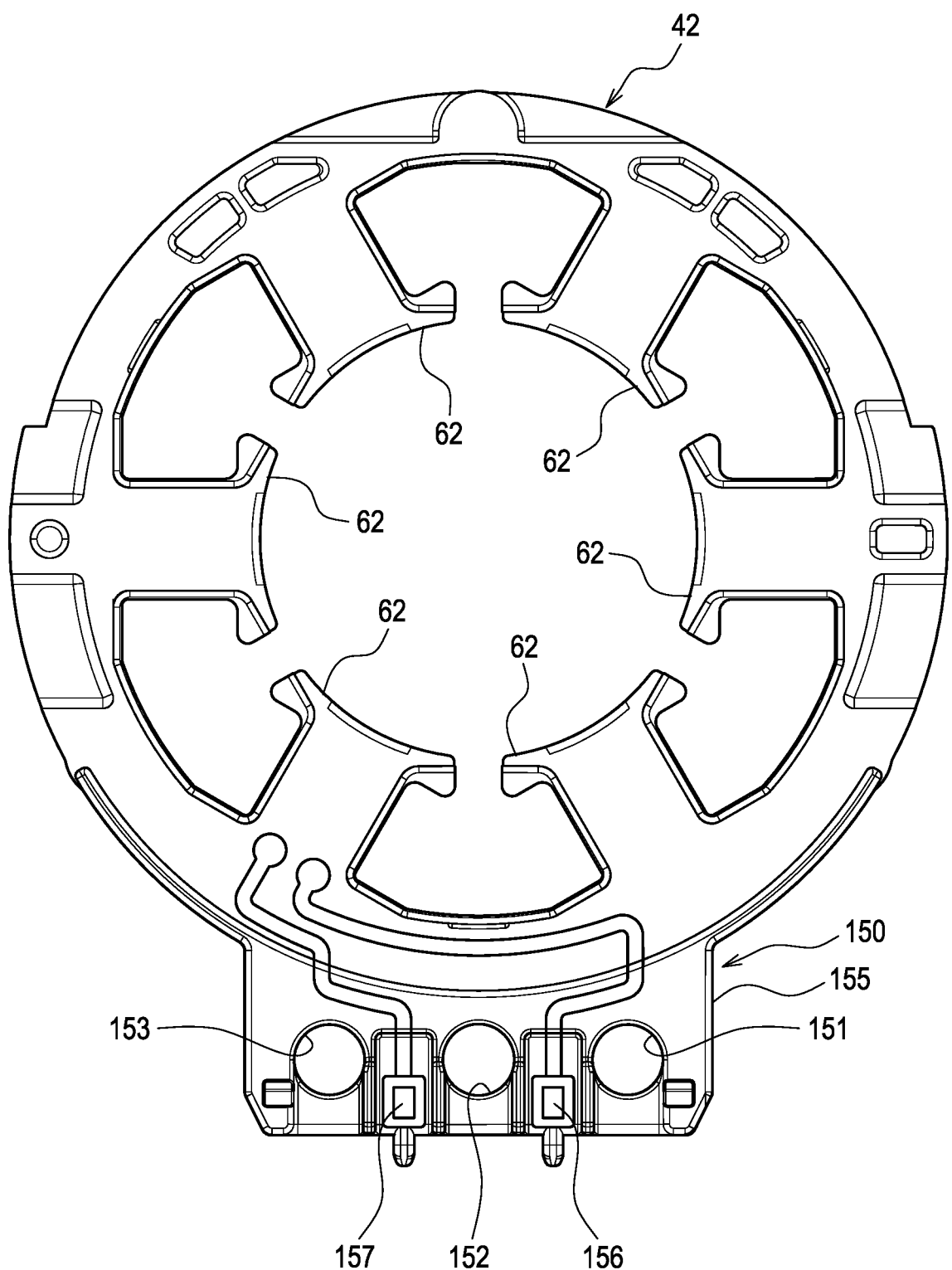
FIG. 14 is a rear-surface view of the first insulator.

As shown in FIG. 8 to FIG. 13, the first sensor-installed tooth 62 includes a receiving space 70. This receiving space 70 is closed by a cover 71 as shown in FIG. 8, FIG. 9, and FIG. 13.

The receiving space 70 is situated on a side surface, facing the driving mechanism 13, of the first tooth main body 63 of the first sensor-installed tooth 62. The temperature sensor 18 is installed in this receiving space 70. In the present embodiment, the temperature sensor 18 has a column shape, for example. As also shown in FIG. 8, FIG. 9, and FIG. 13, the receiving space 70 is filled with a coating agent 72. The coating agent 72 immobilizes and protects the temperature sensor 18. The temperature sensor 18 is partially or entirely covered with the coating agent 72. The coating agent 72 is an insulating member. The coating agent 72 may be a material including resin as a primary component, for example.

As shown in FIG. 10 to FIG. 13, the first tooth main body 63 has a placement surface 80. The placement surface 80 corresponds to a side surface of the first tooth main body 63. The placement surface 80 includes a recess 73. The temperature sensor 18 is installed in the recess 73. The temperature sensor 18 is fixed in the recess 73 with an adhesive, for example. The placement surface 80 does not necessarily include the recess 73.

The first tooth main body 63 includes a first rib 74 having a shape of a long plate, and a second rib 75. The first rib 74 is disposed along a first side edge of the placement surface 80; the first side edge extends in the aforementioned radial direction. The second rib 75 is disposed along a second side edge of the placement surface 80; the second side edge extends in the aforementioned radial direction. The first rib 74 and the second rib 75 are arranged to perpendicularly stand on the placement surface 80. Heights of the first rib 74 and the second rib 75 are equal to each other in the present embodiment. The heights of the first rib 74 and the second rib are measured from the placement surface 80 in an axial direction of the stator 20. The first rib 74 and the second rib 75 extend from a back surface 64a of the first tooth end material 64 (see FIG. 10 and FIG. 12) to an inner circumferential surface 61a of the first back-ring 61 in the aforementioned radial direction.

The aforementioned receiving space 70 is a space surrounded by the first rib 74, the inner circumferential surface 61a, the second rib 75, and the back surface 64a. A height of the receiving space 70 corresponds to the heights of the first rib 74 and the second rib 75.

As shown in FIG. 9, the cover 71 is formed so that its periphery fits along an upper end of the first rib 74, the inner circumferential surface 61a, an upper end of the second rib 75, and the back surface 64a. An aperture of the receiving space 70 is therefore closed by the cover 71.

As shown in FIG. 9 to FIG. 12, the first rib 74 includes a first low-wall portion 74a, and the second rib 75 includes a second low-wall portion 75a. A height of the first low-wall portion 74a from the placement surface 80 is less than the heights of other portions of the first rib 74. A height of the second low-wall portion 75a from the placement surface 80 is less than the heights of other portions of the second rib 75. In other words, each of the first rib 74 and the second rib 75 has a level difference.

The first low-wall portion 74a is disposed outward of the first rib 74 in the radial direction and connected with the inner circumferential surface 61a. Thus, the height of the first rib 74 changes along a distance from the center axis 160 towards the first back-ring 61. More specifically, the height of the first rib 74 at the first low-wall portion 74a is less than the height of the first rib 74 at portions other than the first low-wall portion 74a for a given amount.

Likewise the first low-wall portion 74a, the second low-wall portion 75a is also disposed outward of the second rib 75 in the radial direction and connected with the inner circumferential surface 61a. Thus, the height of the second rib 75 changes along a distance from the center axis 160 towards the first back-ring 61. More specifically, the height of the second rib 75 at the second low-wall portion 75a is less than the height of the second rib 75 at portions other than the second low-wall portion 75a for a given amount.

The first low-wall portion 74a and the second low-wall portion 75a partially or entirely overlap with each other in the circumferential direction of the first back-ring 61.

The heights of the first rib 74 and the second rib 75 may be the same as the height of the temperature sensor 18 installed in the recess 73, or may be higher than the height of the temperature sensor 18, or may be lower than the height of the temperature sensor 18.

As shown in FIG. 13, in the present embodiment, the heights of the first rib 74 and the second rib 75 are higher than the height of the temperature sensor 18. In the present embodiment, in a state where the receiving space 70 is covered with the cover 71, the temperature sensor 18 abuts the cover 71 or is separated from the cover 71 for a given distance.

The first low-wall portion 74a and the second low-wall portion 75a are not necessarily disposed. The first low-wall portion 74a and the second low-wall portion 75a are not necessarily disposed. In other words, each of the first rib 74 and the second rib 75 may have a constant height. In the present embodiment, the first low-wall portion 74a and the second low-wall portion 75a are disposed to increase efficiency in a process of winding the first coil 31 around the sensor-installed tooth 22.

The process of winding the first coil 31 around the sensor-installed tooth 22 begins with winding the first coil 31 from an outward portion of the stator tooth main body 23 in the radial direction (in other words, from a portion close to the stator back-ring 21). In this process, the winding of the first coil 31 starts from an area where the first low-wall portion 74a and the second low-wall portion 75a are disposed.

The first low-wall portion 74a and the second low-wall portion 75a inhibit the first coil 31 from sliding towards the center axis 160 in an initial stage of the winding of the first coil 31. The first coil 31 is thereby kept in a proper position close to the stator back-ring 21. The first coil 31 can therefore be properly and efficiently wound.

The temperature sensor 18 includes two terminals. These two terminals are connected with a first wiring 81 and a second wiring 82. The temperature sensor 18 is electrically coupled with the controller 15 via the first wiring 81 and the second wiring 82.

The first wiring 81 and the second wiring 82 may be any form of wiring and may be disposed by any method. In the present embodiment, the first wiring 81 and the second wiring 82 are integrally molded with the placement surface 80 and disposed on a surface of the placement surface 80 (in other words, integrally molded with the first insulator 42).

In other words, in the present embodiment, the first insulator 42 is one kind of Molded Interconnect Devices (MID). The MID means resin-molded member with a patterned conductor formed thereon. On the first insulator 42, the first wiring 81 and the second wiring 82 include patterned conductors.

The MID may be formed by various methods. One known method of forming the MID is a Laser Direct Structuring (LDS) method. The first wiring 81 and the second wiring 82 may be formed on the first insulator 42 by the LDS method for example.

The coating agent 72 may be disposed by any method and in any amount. In the present embodiment, the coating agent 72 is disposed by a low-temperature/low-pressure molding for example. More specifically, the coating agent 72 is disposed to cover the first wiring 81 and the second wiring 82, and also to partially or entirely cover the temperature sensor 18. The low-temperature/low-pressure molding is a publicly-known molding method also known as a hot melt molding.

(1-5) Electrical Coupling Between Temperature Sensor and Controller

A configuration for electrically coupling the temperature sensor 18 with the controller 15 will be explained below with reference to FIG. 14 to FIG. 21. In the present embodiment, the motor 12 is provided with a connection member 150. The electric work machine 1 in the present embodiment further includes a connector 200. The temperature sensor 18 is electrically coupled with the controller 15 by coupling the connector 200 to the connection member 150.

(1-5-1) Connection Member

The connection member 150 will be described below with reference to FIG. 14 to FIG. 19. The connection member 150 is disposed on the stator 20. More specifically, the connection member 150 is disposed on the first insulator 42.

The connection member 150 includes a connection main body 155. The connection main body 155 corresponds to a part of the first insulator 42. The connection main body 155 is one kind of the MID. In other words, the connection main body 155 is an integrally-molded member containing an insulating material (for example, resin). The connection main body 155 includes screw holes 151, 152, and 153. The connection main body 155 includes a first arrangement surface 161 and a second arrangement surface 171.

The connection member 150 also includes a first sensor terminal 156 and a second sensor terminal 157. Each of the first sensor terminal 156 and the second sensor terminal 157 includes metal (that is, a conductor). The first sensor terminal 156 is integrally formed on the first arrangement surface 161. The second sensor terminal 157 is integrally formed on the second arrangement surface 171.

The first sensor terminal 156 and the second sensor terminal 157 are disposed separately from a first patterned wiring 167 and a second patterned wiring 177, and the like, which will be mentioned later. Each of the first sensor terminal 156 and the second sensor terminal 157 may be a solid metal (for example, a copper alloy) for example.

Figure 16:
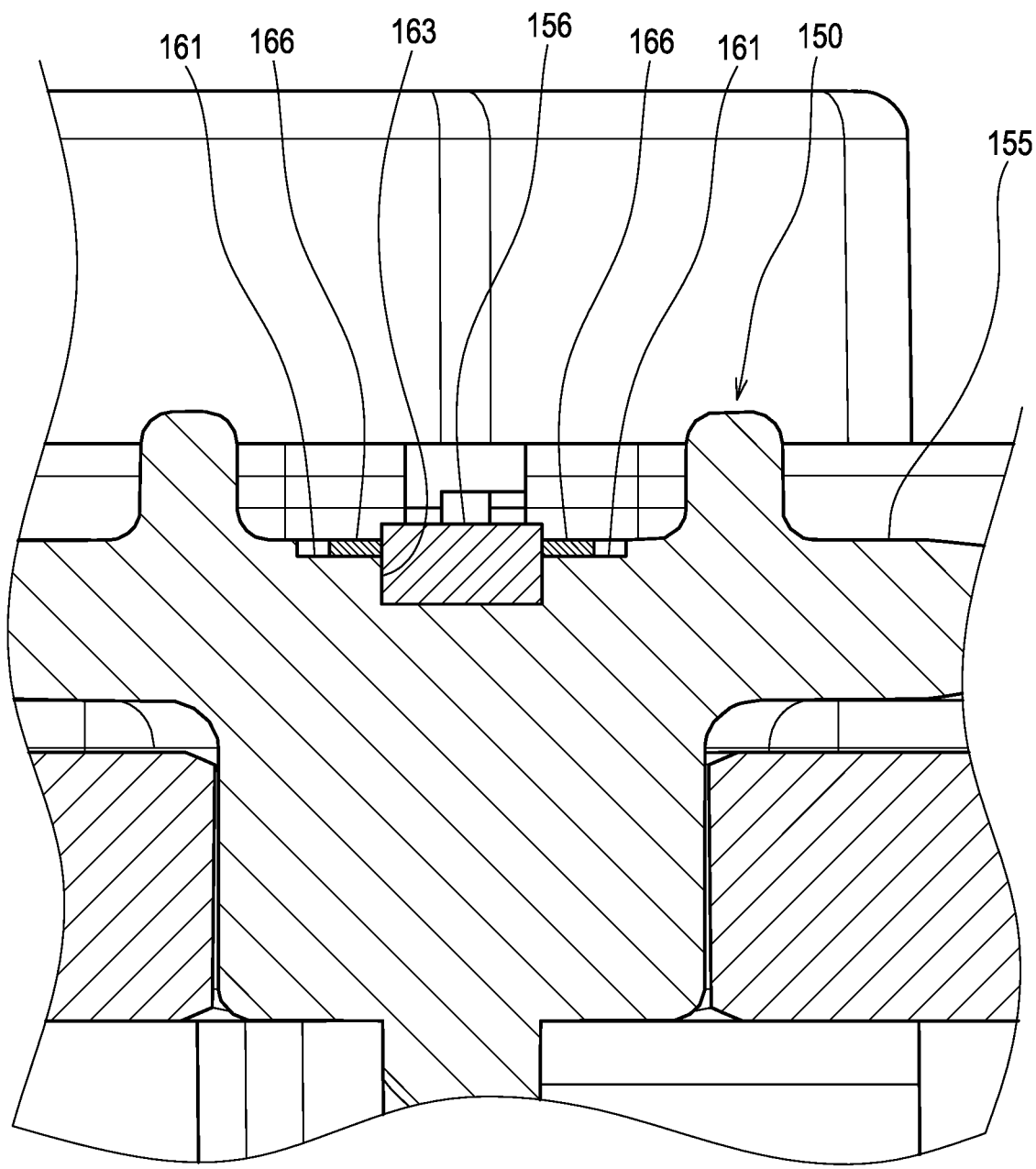
FIG. 16 is a cross-sectional view taken along line XVI-XVI in FIG. 15.

In the present embodiment, each of the first sensor terminal 156 and the second sensor terminal 157 has an approximately rectangular solid shape (for example, a plate-like shape). The first sensor terminal 156 and the second sensor terminal 157 are each partially embedded in the connection main body 155. In other words, as shown in FIG. 16, the first arrangement surface 161 includes a first recess 163. The second arrangement surface 171 includes a second recess 173. As shown in FIG. 16, the first sensor terminal 156 is partially embedded in the first recess 163; and the second sensor terminal 157 is partially embedded in the second recess 173.

The first sensor terminal 156 and the second sensor terminal 157 may be molded on the connection main body 155 by an insert molding during a process of an integral molding (injection molding, for example) of the first insulator 42 for example. Such an insert molding may be performed as below, for example.

Prior to the injection molding, the first sensor terminal 156 and the second sensor terminal 157 are placed in a mold of the first insulator 42. The first sensor terminal 156 and the second sensor terminal 157 are each placed inside the mold to be partially embedded in the first insulator 42. An insulating material liquefied by heating (for example, molten resin) is poured into the mold with the first sensor terminal 156 and the second sensor terminal 157 placed therein. Solidification of the poured insulating material forms the first insulator 42 integrated with the first sensor terminal 156 and the second sensor terminal 157.

The first sensor terminal 156 comes into contact with a first contact 214a of the connector 200, which will be mentioned later, and is electrically coupled with the first contact 214a. The second sensor terminal 157 comes into contact with a second contact 215a of the connector 200, which will be mentioned later, and electrically coupled with the second contact 215a.

Figure 15:
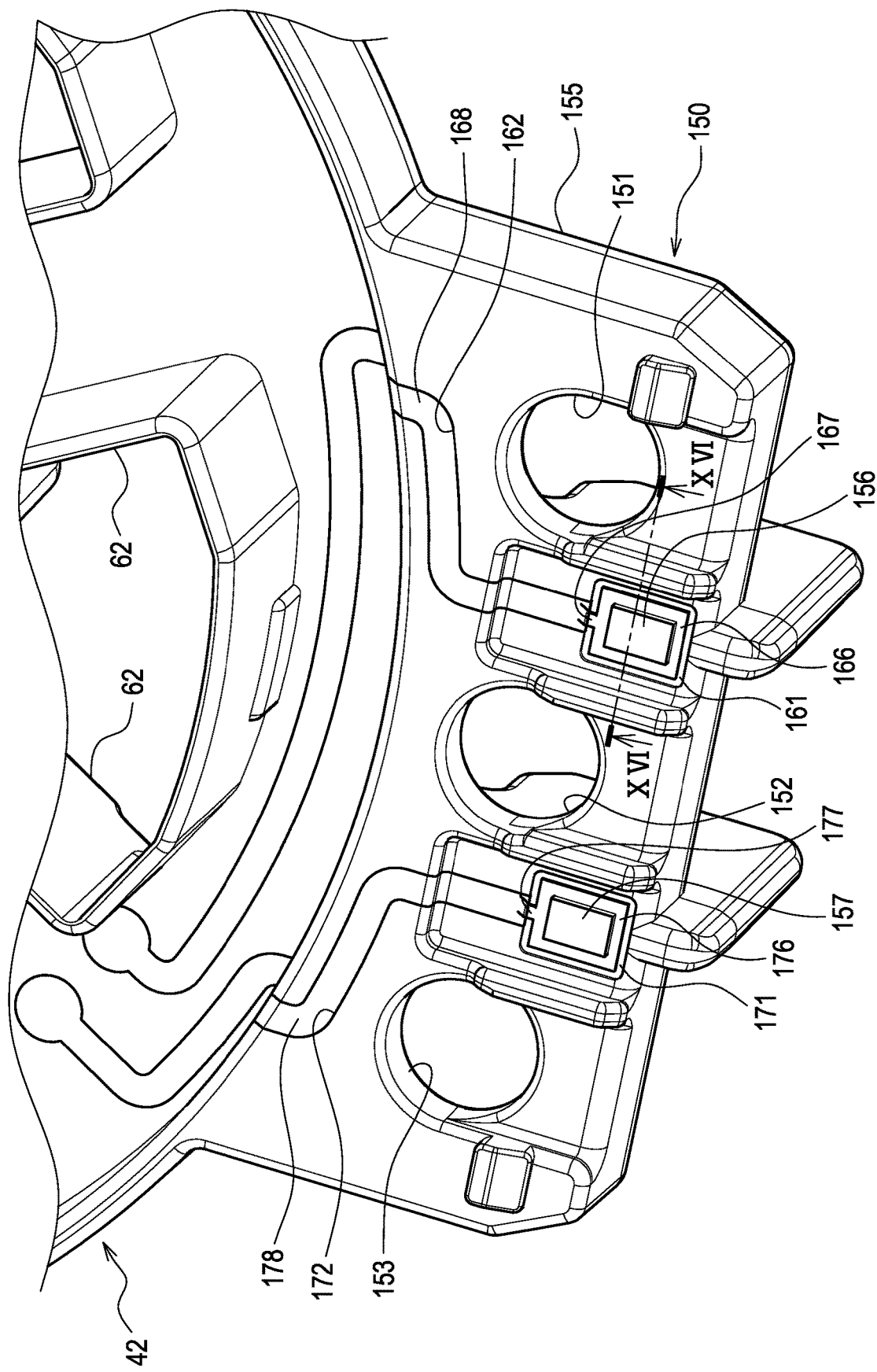
FIG. 15 is an enlarged partial view of the first insulator.

As shown in FIG. 15, the connection main body 155 includes a first groove 162 and a second groove 172. The first groove 162 and the second groove 172 are formed on a surface of the connection main body 155. The surface of the connection main body 155 includes the first patterned wiring 167 and the second patterned wiring 177. More specifically, the first patterned wiring 167 is disposed on a bottom surface 162a of the first groove 162 (see FIG. 19); and the second patterned wiring 177 is disposed on a bottom surface of the second groove 172 (not shown). Each of the first patterned wiring 167 and the second patterned wiring 177 has a conductor (for example, metal).

As shown in FIG. 15, the first groove 162 is almost entirely filled with a first protective member 168. Thus, a large part of the first patterned wiring 167 is covered with the first protective member 168. The second groove 172 is almost entirely filled with a second protective member 178. Thus, a large part of the second patterned wiring 177 is covered with the second protective member 178. Each of the first protective member 168 and the second protective member 178 may be, for example, an insulating material (for example, resin).

The first patterned wiring 167 and the second patterned wiring 177 are electrically coupled with the temperature sensor 18. More specifically, for example, the first patterned wiring 167 may be coupled with the temperature sensor 18 via the first wiring 81 (see FIG. 10); and the second patterned wiring 177 may be coupled with the temperature sensor 18 via the second wiring 82 (see FIG. 10).

As shown in FIG. 15, the first sensor terminal 156 is electrically coupled with the first patterned wiring 167 via a first patterned connection 166. In other words, the first patterned connection 166 is coupled with the first patterned wiring 167. The first patterned connection 166 includes a conductor (for example, metal). The first patterned connection 166 is also coupled with the first sensor terminal 156. In the present embodiment, the first patterned connection 166 is arranged on the first arrangement surface 161 so as to surround the first sensor terminal 156. A whole periphery of the first sensor terminal 156 contacts the first patterned connection 166.

The second sensor terminal 157 is electrically coupled with the second patterned wiring 177 via a second patterned connection 176. In other words, the second patterned connection 176 is coupled with the second patterned wiring 177. The second patterned connection 176 includes a conductor (for example, metal). The second patterned connection 176 is also coupled with the second sensor terminal 157. In the present embodiment, the second patterned connection 176 is arranged on the second arrangement surface 171 so as to surround the second sensor terminal 157. A whole periphery of the second sensor terminal 157 contacts the second patterned connection 176.

In the present embodiment, the first patterned connection 166 is formed integrally with the first patterned wiring 167 by, for example, the LDS method as mentioned later. The second patterned connection 176 is formed integrally with the second patterned wiring 177 by, for example, the LDS method as mentioned later.

Such a configuration electrically couples the first sensor terminal 156 with the temperature sensor 18 via the first patterned connection 166 and the first patterned wiring 167. The second sensor terminal 157 is electrically coupled with the temperature sensor 18 via the second patterned connection 176 and the second patterned wiring 177.

In the present embodiment, the first sensor terminal 156 is harder than the first patterned wiring 167; and the second sensor terminal 157 is harder than the second patterned wiring 177. The hardness of the first sensor terminal 156 and the hardness of the second sensor terminal 157 may be equal to each other or may be different from each other. The hardness of the first patterned wiring 167 and the hardness of the second patterned wiring 177 may be equal to each other or may be different from each other. In the present embodiment, the first sensor terminal 156 is thicker than the first patterned wiring 167; and the second sensor terminal 157 is thicker than the second patterned wiring 177. The thickness of the first sensor terminal 156 and the thickness of the second sensor terminal 157 may be equal to each other or may be different from each other. The thickness of the first patterned wiring 167 and the thickness of the second patterned wiring 177 may be equal to each other or may be different from each other. The thicknesses described in this specification are lengths in a direction perpendicular to the first arrangement surface 161 (in the present embodiment, a direction parallel with the rotational axis of the motor 12).

Hereinafter, a manufacturing process of the connection member 150 will be schematically explained. The manufacturing process includes, for example, a first step, a second step, and a third step as described below.

Figure 17:
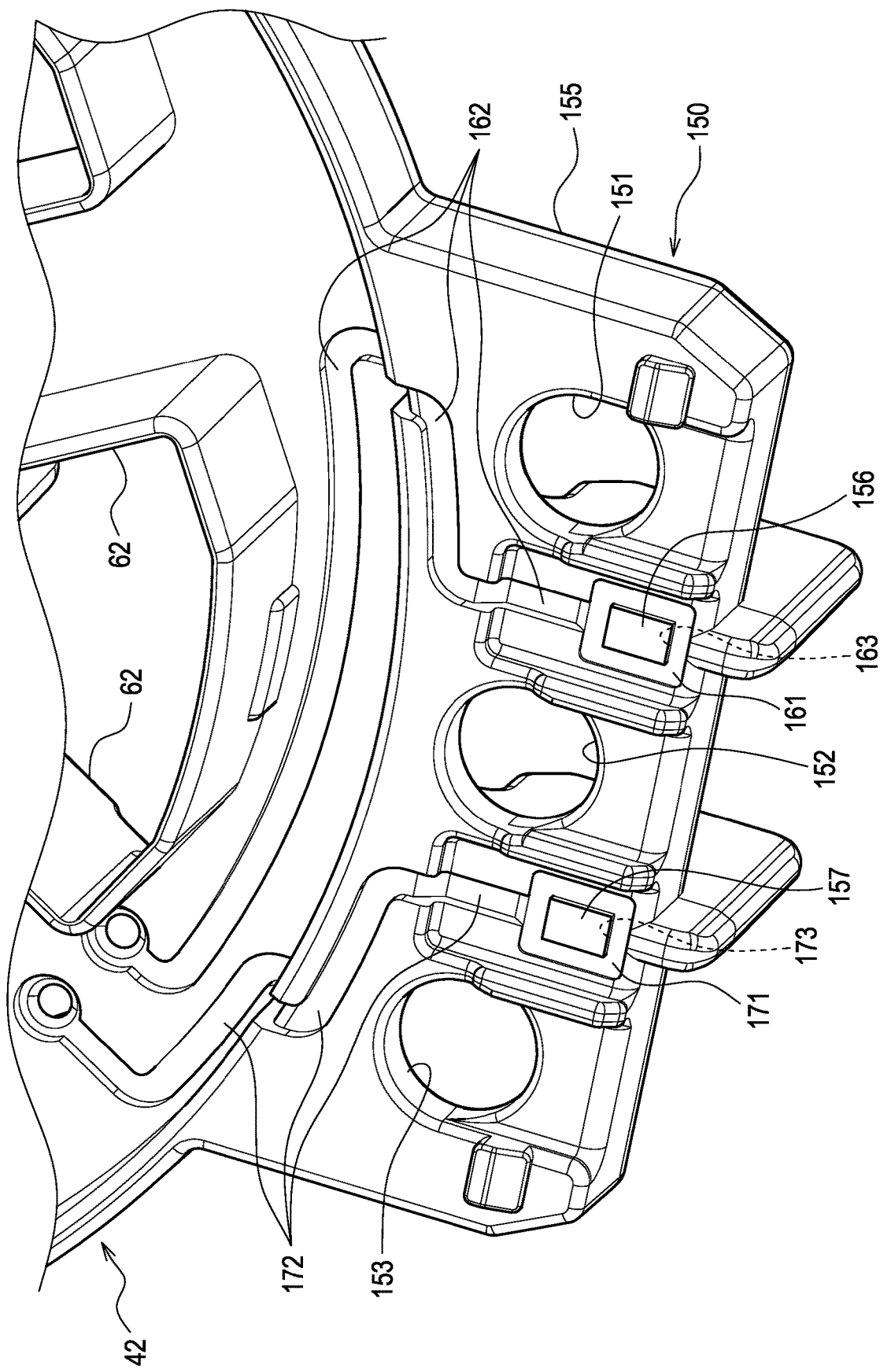
FIG. 17 is an enlarged partial view of the first insulator prior to placement of a patterned wiring and a protective member.

In the first step, as mentioned above, the first insulator 42 integrated with the first sensor terminal 156 and the second sensor terminal 157 is completely formed by the insert molding. FIG. 17 illustrates the connection member 150 after completing the first step. In this stage, the first groove 162 and the second groove 172 are already formed, but the first patterned wiring 167 and the second patterned wiring 177 are not yet formed.

Figure 18:
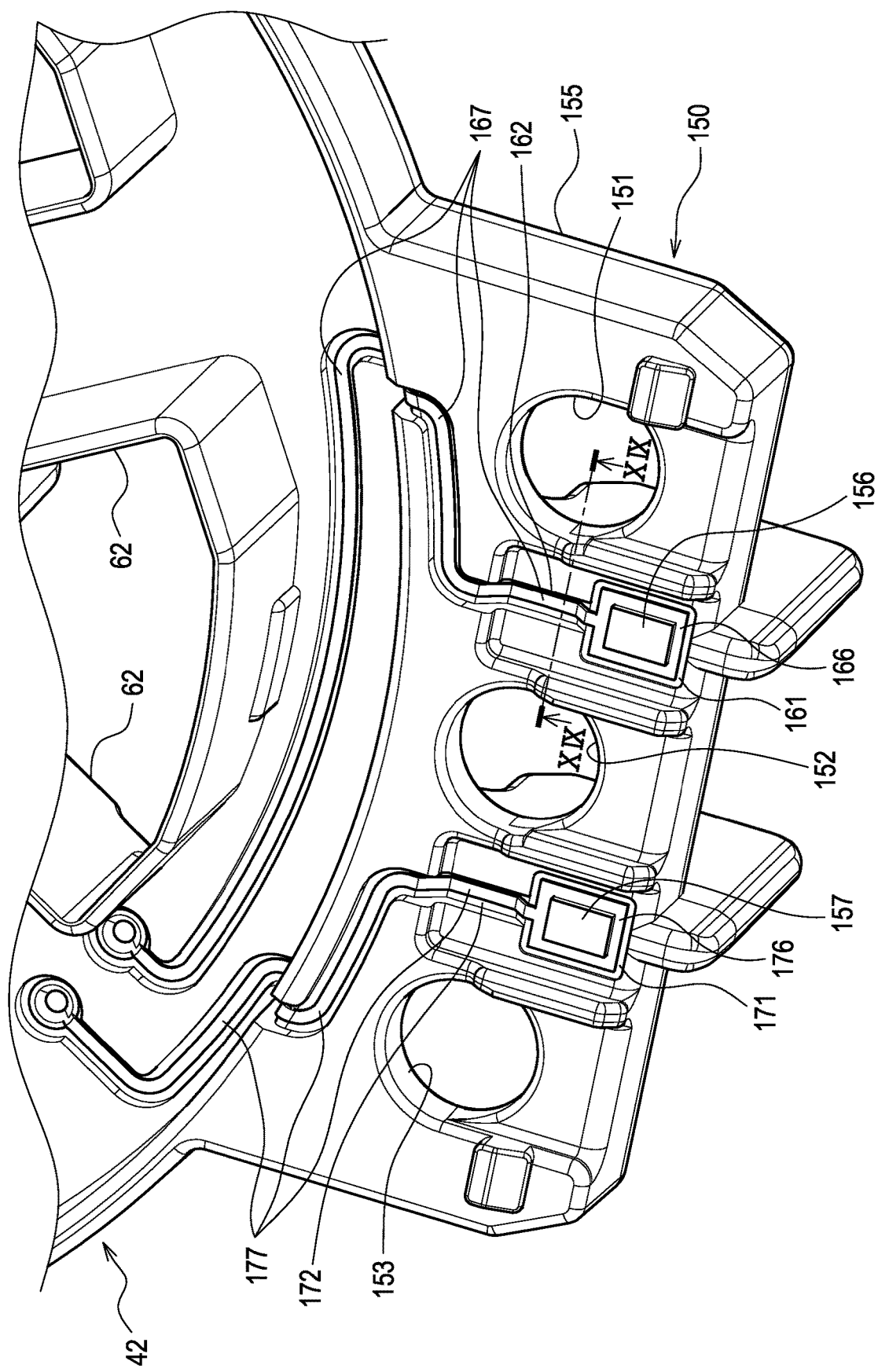
FIG. 18 is an enlarged partial view of the first insulator prior to placement of the protective member.
Figure 19:
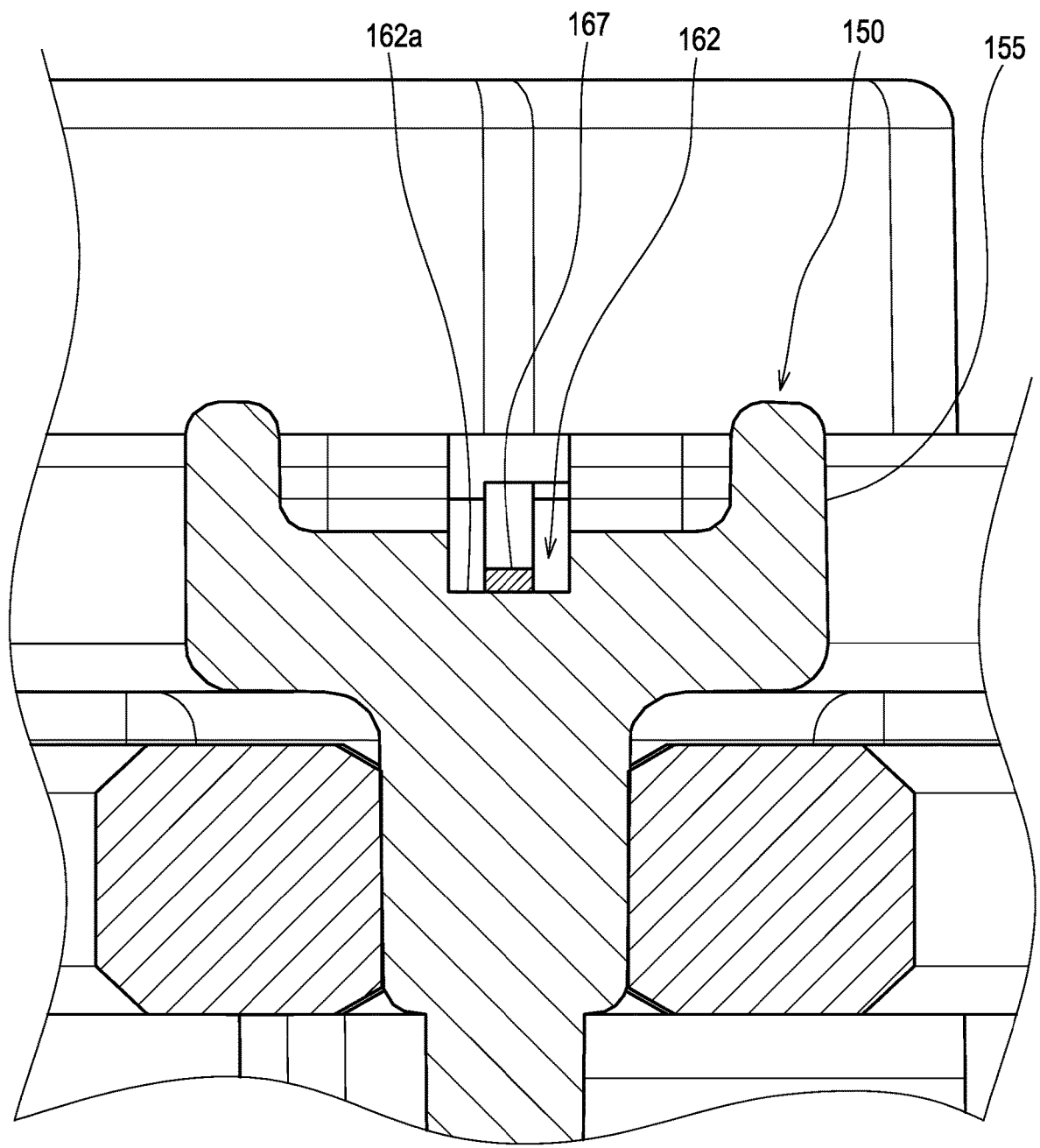
FIG. 19 is a cross-sectional view taken along line XIX-XIX in FIG. 18.

In the second step, the first patterned wiring 167, the second patterned wiring 177, the first patterned connection 166, and the second patterned connection 176 are formed by, for example, the LDS method. More specifically, the first patterned wiring 167 is formed on the bottom surface 162a of the first groove 162, and at the same time, the first patterned connection 166 is formed on the first arrangement surface 161; and the second patterned wiring 177 is formed on the bottom surface of the second groove 172, and at the same time, the second patterned connection 176 is formed on the second arrangement surface 171. FIG. 18 illustrates the connection member 150 after completing the second step.

In the third step, the first groove 162 is filled with the first protective member 168, and the second groove 172 is filled with the second protective member 178. FIG. 15 illustrates the connection member 150 after completing the third step.

(1-5-2) Connector

Figure 20:
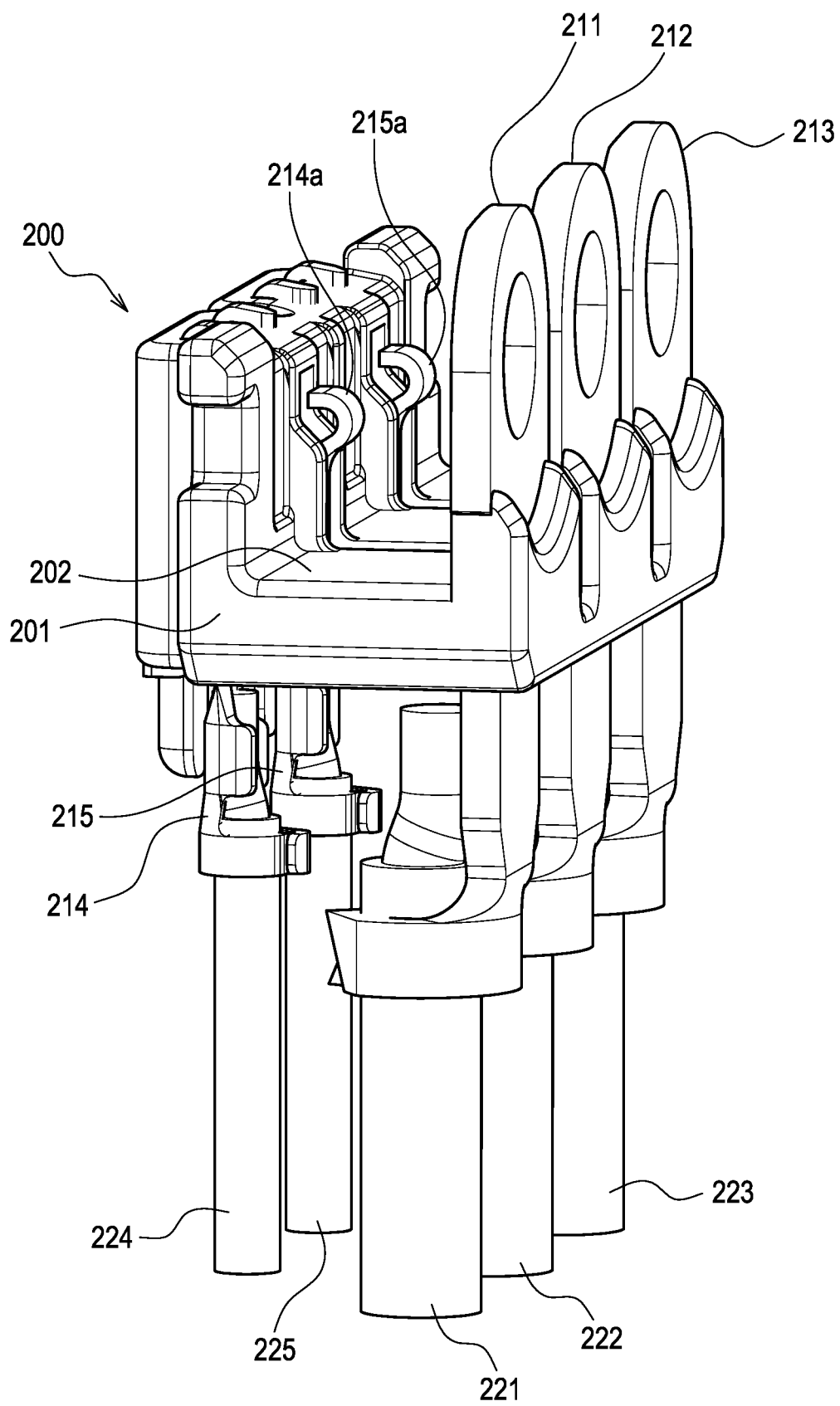
FIG. 20 is a perspective view of a connector.

The connector 200 will be explained below with reference to FIG. 20 and FIG. 21. As shown in FIG. 20, the connector 200 includes a case 201, a first connector terminal 211, a second connector terminal 212, a third connector terminal 213, a fourth connector terminal 214, and a fifth connector terminal 215. The first connector terminal 211, the second connector terminal 212, the third connector terminal 213, the fourth connector terminal 214, and the fifth connector terminal 215 are fixed to the case 201. The first connector terminal 211, the second connector terminal 212, the third connector terminal 213, the fourth connector terminal 214, and the fifth connector terminal 215 include metal (that is, a conductor).

The case 201 includes an insertion groove 202. The aforementioned connection member 150 is inserted into the insertion groove 202. In other words, the connection member 150 is detachable from the connector 200. The first connector terminal 211, the second connector terminal 212, and the third connector terminal 213 are arranged along a first side surface of the case 201. The fourth connector terminal 214 and the fifth connector terminal 215 are arranged along a second side surface of the case 201 facing the first side surface.

The first connector terminal 211 is coupled with a first lead wire 221. The first connector terminal 211 is electrically coupled with the controller 15 via the first lead wire 221. The second connector terminal 212 is coupled with a second lead wire 222. The second connector terminal 212 is electrically coupled with the controller 15 via the second lead wire 222. The third connector terminal 213 is coupled with a third lead wire 223. The third connector terminal 213 is electrically coupled with the controller 15 via the third lead wire 223. The fourth connector terminal 214 is coupled with a fourth lead wire 224. The fourth connector terminal 214 is electrically coupled with the controller 15 via the fourth lead wire 224. The fifth connector terminal 215 is coupled with a fifth lead wire 225. The fifth connector terminal 215 is electrically coupled with the controller 15 via the fifth lead wire 225.

The fourth connector terminal 214 includes the aforementioned first contact 214a. The fifth connector terminal 215 includes the aforementioned second contact 215a.

Figure 21:
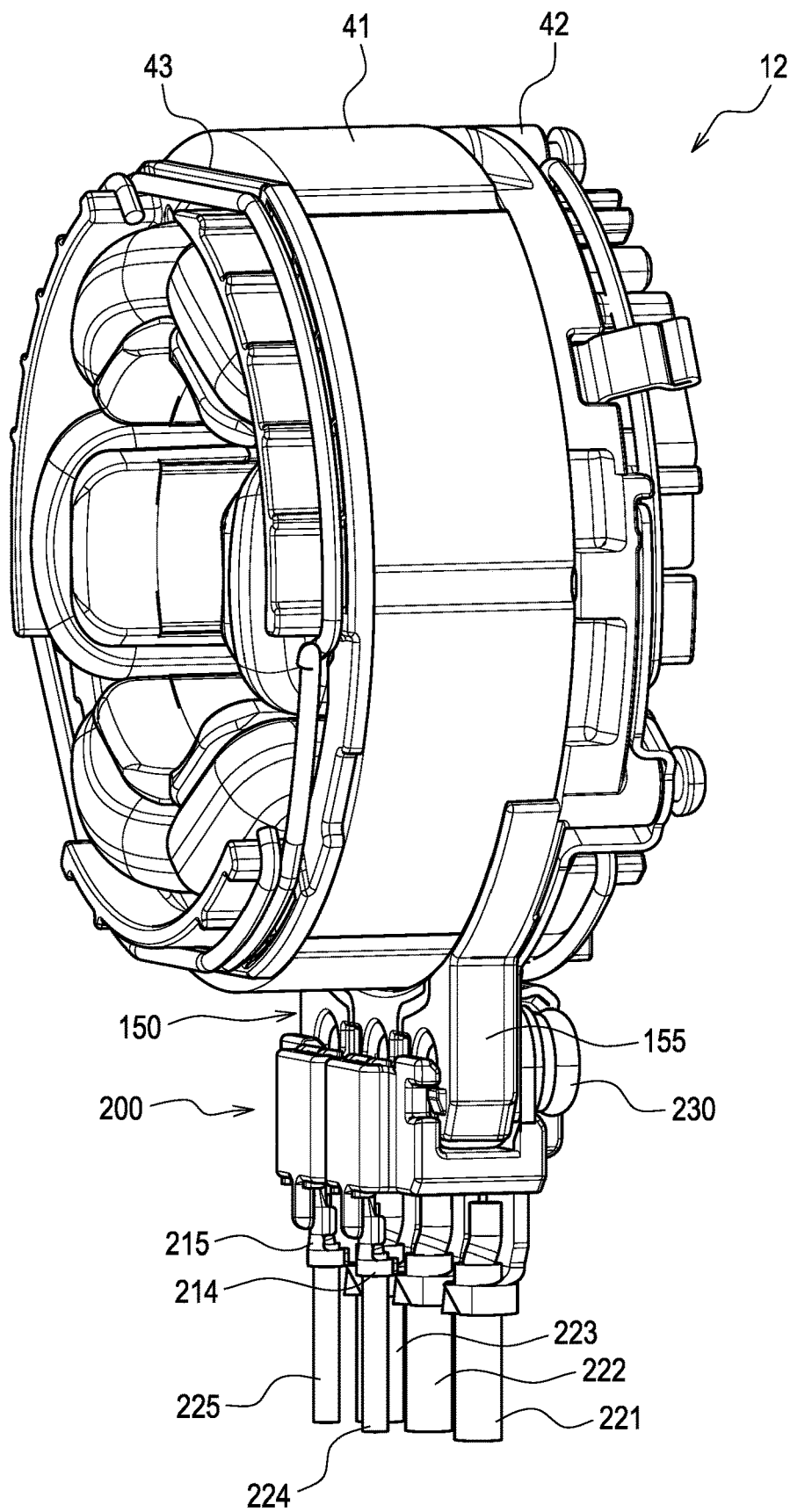
FIG. 21 is a perspective view of the motor coupled with the connector.

In the electric work machine 1 as shown in FIG. 21, the connection member 150 is connected with the connector 200 by an insertion of the connection member 150 into the insertion groove 202. In this state, the first contact 214a comes into contact with the first sensor terminal 156 and is electrically coupled with the first sensor terminal 156. The second contact 215a comes into contact with the second sensor terminal 157 and is electrically coupled with the second sensor terminal 157. In other words, the temperature sensor 18 is electrically coupled with the controller 15 via the first contact 214a and the second contact 215a.

The first connector terminal 211 is in contact with a first motor terminal disposed in the motor 12. The second connector terminal 212 is in contact with a second motor terminal disposed in the motor 12. The third connector terminal 213 is in contact with a third motor terminal disposed in the motor 12. In other words, the motor 12 is electrically coupled with the controller 15 via the first connector terminal 211, the second connector terminal 212, and the third connector terminal 213. The first connector terminal 211 and the first motor terminal are fastened with a screw 230 screwed into a screw hole 151. Likewise, the second connector terminal 212 and the second motor terminal are fastened with a screw (not shown) screwed into a screw hole 152. The third connector terminal 213 and the third motor terminal are fastened with a screw (not shown) screwed into a screw hole 153.

(1-6) Effect of Embodiment

According to the embodiment mentioned above, the following effects (1a) to (1g) are attained.

(1a) In the electric work machine 1 in the present embodiment, the temperature sensor 18 is installed in the stator tooth 22 (that is, the sensor-installed tooth 22) of the stator 20, which is wound with the first coil 31. The temperature sensor 18 can thereby properly and stably detect the temperature of the motor 12.

(1b) The temperature sensor 18 is installed on the placement surface 80. The placement surface 80 is a side surface of the sensor-installed tooth 22 facing outward of the motor 12 in the axial direction, which is along the rotational axis of the motor 12. This makes it easier to install the temperature sensor 18 in the motor 12 of the electric work machine 1 in the present embodiment and enables efficient installment of the temperature sensor 18 in the motor 12.

(1c) The temperature sensor 18 is installed on the side surface of the sensor-installed tooth 22 such that the first coil 31 entirely covers the temperature sensor 18. Thus, in the electric work machine 1 in the present embodiment, a heat generated at the first coil 31 is properly and swiftly transmitted to the temperature sensor 18, which enables a proper and swift detection of the temperature of the motor 12.

(1d) The stator 20 is formed by combining the stator core 41, the first insulator 42, and the second insulator 43. The temperature sensor 18 is installed in the first sensor-installed tooth 62 of the first insulator 42. Thus, in the electric work machine 1 in the present embodiment, the temperature sensor 18 can be easily installed in the motor 12.

(1e) The first sensor-installed tooth 62 includes the first tooth main body 63 and the first tooth end material 64 having a flange-like shape. The temperature sensor 18 is installed on the placement surface 80 of the first tooth main body 63. The placement surface 80 is facing outward of the motor 12 and is a surface of the first insulator 42, which is another body separate from the stator core 41. By having the temperature sensor 18 thus installed on the placement surface 80 of the first insulator 42, the temperature sensor 18 can be more easily installed in the motor 12.

(1f) The first tooth main body 63 includes the first rib 74, and the second rib 75. The first rib 74 and the second rib 75 stand on the placement surface 80 so as to face each other. The temperature sensor 18 is installed in the receiving space 70 formed with the first rib 74 and the second rib 75. This reduces a pressure applied to the temperature sensor 18 from the first coil 31.

(1g) The first rib 74 includes the first low-wall portion 74a; and the second rib 75 includes the second low-wall portion 75a. In the present embodiment, in the initial stage of winding the first coil 31 around the first sensor-installed tooth 62, the winding of the first coil 31 can begin from a position where the first coil 31 contacts the first low-wall portion 74a and the second low-wall portion 75a. Therefore, a position for starting the winding of the first coil 31 can be determined based on the first low-wall portion 74a and for the second low-wall portion 75a. Winding of the first coil 31 around the first sensor-installed tooth 62 can therefore be properly and efficiently performed.

The chuck sleeve 8 corresponds to one example of the driver in the present disclosure. The stator back-ring 21 corresponds to one example of the cylindrical body in the present disclosure. The sensor-installed tooth 22 corresponds to one example of the tooth in the present disclosure. The first coil 31 corresponds to one example of the coil in the present disclosure. The first insulator 42 corresponds to one example of the insulator in the present disclosure. The back core 51 corresponds to one example of the core tubular body in the present disclosure. The core tooth 52 corresponds to one example of the core tooth in the present disclosure. The first back-ring 61 corresponds to one example of the insulator tubular body in the present disclosure. The first sensor-installed tooth 62 corresponds to one example of the insulator tooth in the present disclosure. The first tooth main body 63 of the first sensor-installed tooth 62 corresponds to one example of the tooth body in the present disclosure. The first tooth end material 64 of the first sensor-installed tooth 62 corresponds to one example of the end material of the present disclosure. The placement surface 80 corresponds to one example of the second side surface of the present disclosure. The coating agent 72 corresponds to one example of the insulating member of the present disclosure. The connector 200 corresponds to one example of the connection target member of the present disclosure. Each of the fourth connector terminal 214 and the fifth connector terminal 215 corresponds to one example of the first terminal in the present disclosure. Each of the first patterned wiring 167 and the second patterned wiring 177 corresponds to one example of the patterned wiring in the present disclosure. Each of the first sensor terminal 156 and the second sensor terminal 157 corresponds to one example of the second terminal in the present disclosure.

2. Other Embodiments

An embodiment of the present disclosure has been explained above. Nevertheless, the present disclosure can be carried out in various modifications without being limited to the aforementioned embodiment.

(2-1) In the aforementioned embodiment, the receiving space 70 that accommodates the temperature sensor 18 is closed with the cover 71. The cover 71 does not have to be disposed. In other words, in the aforementioned embodiment, there may be no cover 71, and the temperature sensor 18 may face the first coil 31 directly or via the coating agent 72. In this case, the temperature sensor 18 may contact the first coil 31 directly or via the coating agent 72.

(2-2) The temperature sensor 18 may be disposed on the placement surface 80 in any orientation. In other words, in the aforementioned embodiment, the temperature sensor 18 has a column shape and disposed so that the axial direction of the temperature sensor 18 is perpendicular to the radial direction of the stator 20; however, the axial direction of the temperature sensor 18 may be oriented in any manner with respect to the radial direction of the stator 20. For example, as illustrated in FIG. 22, the axial direction of the temperature sensor 18 and the radial direction of the stator 20 may be oriented parallel with each other.

Figure 22:
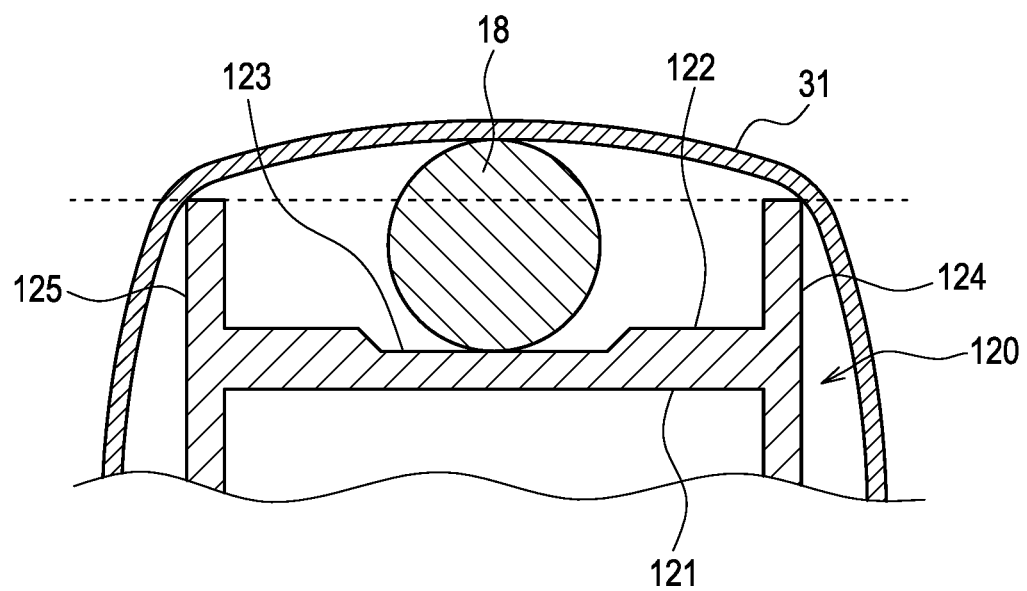
FIG. 22 is a sectional view showing a different example of the first sensor-installed tooth.

A first tooth 120 shown in FIG. 22 includes a first tooth main body 121. The first tooth main body 121 includes a placement surface 122 that includes a recess 123. The temperature sensor 18 is installed in this recess 123. The first tooth main body 121 includes a first rib 124 and a second rib 125 likewise the aforementioned embodiment. The first rib 124 and the second rib 125 stand on the placement surface 122.

The first rib 124 and the second rib 125 are of the same height. The heights of the first rib 124 and the second rib 125 are less than the height of the temperature sensor 18. In FIG. 22, the cover 71 described in the aforementioned embodiment is not disposed; and the first coil 31 abuts the temperature sensor 18 directly or via a coating agent and the like.

As a consequence of the first coil 31 abutting the temperature sensor 18, a swift transmission of the temperature of the first coil 31 to the temperature sensor 18 is facilitated. Also as a consequence of the first coil 31 abutting the temperature sensor 18, a pressure from the first coil 31 towards the placement surface 122 is imposed on the temperature sensor 18. Such pressure is reduced by the first rib 124 and the second rib 125.

(2-3) The temperature sensor 18 may be installed anywhere in the first tooth 62. The temperature sensor 18 may be installed on a side surface of the first tooth main body 63 distinct from the side surface described in the aforementioned embodiment. The temperature sensor 18 may be installed in the first tooth end material 64 for example.

(2-4) It is not necessary that the temperature sensor 18 entirely overlaps with the first coil 31 in the front view of the motor 12 taken along the center axis 160. The temperature sensor 18 may be installed so as not to partially or entirely overlap with the first coil 31 in the front view of the motor 12.

(2-5) The temperature sensor 18 may be installed in a stator tooth wound with a coil which is distinct from the first coil 31.

The temperature sensor 18 does not have to be installed in/on the first tooth 62 of the first insulator 42 and may be installed in/on any part of the stator tooth 22. The temperature sensor 18 may be installed in/on the second tooth 57 of the second insulator 43 for example. Alternatively, the temperature sensor 18 may be installed in/on the core tooth 52 of the stator core 41 for example.

(2-6) In addition to the temperature sensor 18, at least one additional temperature sensor may be installed. In this case, the temperature sensor 18 and the at least one additional temperature sensor may be installed in/on the same stator tooth.

(2-7) The temperature sensor 18 may be different from a thermistor. The temperature sensor 18 may be, for example, an element or a circuit, such as a thermocouple and a resistance temperature detector, that is configured to change its electrical properties depending on the temperature and be able to output a signal corresponding to such change in the electrical properties.

The temperature sensor 18 may also have a pillar-like shape different from a column. The temperature sensor 18 may have a column shape or, for example, a prismatic shape (in other words, a cubical shape or a rectangular solid shape). The temperature sensor 18 may have a shape different from a prismatic shape.

(2-8) The motor 12 may be a motor other than a brushless motor. The electric work machine 1 may operate with an electric power distinct from the battery power. For example, the electric work machine 1 may include a motor that is configured to receive commercial 100V AC power input and that is able to be driven by the AC power.

(2-9) The first sensor terminal 156 and the second sensor terminal 157 may be embedded in the connection main body 155 down to any depth. The first sensor terminal 156 and/or the second sensor terminal 157 may be entirely embedded in the connection main body 155.

(2-10) The first sensor terminal 156 and/or the connection main body 155 may include a fall reduction mechanism for reducing a fall of the first sensor 156 from the connection main body 155. For example, a member to engage with the connection main body 155 (for example, a hook-shaped member) is disposed on a surface of the first sensor terminal 156 facing the connection main body 155; and this member may be embedded in the connection main body 155. The same applies to the second sensor terminal 157.

(2-11) The first sensor terminal 156 and/or the second sensor terminal 157 may be disposed on the connection main body 155 by a method different from the insert molding. For example, the first sensor terminal 156 and/or the second sensor terminal 157 may be fixed to the surface of the connection main body 155 with an adhesive. For example, the first sensor terminal 156 and/or the second sensor terminal 157 may also be fixed to the connection main body 155 by means of a mechanism similar to the aforementioned fall reduction mechanism.

(2-12) The first sensor terminal 156 and the second sensor terminal 157 may have any shape. The connector 200 does not have to include the first connector terminal 211, the second connector terminal 212, and the third connector terminal 213.

A wiring structure for electrically coupling the temperature sensor 18 with the controller 15, explained with reference to FIG. 14 to FIG. 19, may be applied to various electrical couplings in the electric work machine.

(2-14) In the aforementioned embodiment, the rechargeable impact driver was described as one example of the electric work machine. Nevertheless, the technique in the present disclosure may be applied to other electric work machines that are configured to operate on a target. The target of operation may be any substances, for example, various workpieces such as woods, metals, and plastics; various fasteners such as screws, nails, and nuts; plants; dusts; gasses; and liquids. The electric work machine may include any driven member. A driven member may operate on the target of operation in any ways. The driven member may be, for example, a drill bit that works to make a hole in the workpiece; a rotary blade that works to cut the workpiece; a grinding stone that works to polish the workpiece; and a rotary wing that works to let gasses or liquids in or out.

The technique in the present disclosure may be applied to various job-site electric apparatus used at a work site of, for example, home carpentry, manufacturing, gardening, and construction. More specifically, the technique in the present disclosure may be applied to various electric work machines having a driven member, for example, an electric power tool for stone processing, metal processing, or wood processing; a work machine for gardening; and a device for improving a work site environment. More particularly, the present disclosure may be applied to various electric work machines, for example, an electric hammer; an electric hammer drill; an electric drill; an electric screwdriver; an electric wrench; an electric grinder; an electric circular saw; an electric reciprocating saw; an electric jigsaw; an electric cutter; an electric chainsaw; an electric planer; an electric nailer (including a tacker); an electric hedge trimmer; an electric lawn mower; an electric lawn trimmer; an electric grass cutter; an electric cleaner; an electric blower; an electric sprayer; an electric spreader; and an electric dust collector.

(2-15) Two or more functions achieved by one element of the aforementioned embodiment may be achieved by two or more elements; and, one function achieved by one element may be achieved by two or more elements. Two or more functions achieved by two or more elements may be achieved by one element; and one function achieved by two or more elements may be achieved by one element. A part of the configurations of the aforementioned embodiments may be omitted. An element in any one of the aforementioned embodiments may be added to or replaced in another embodiment.

The invention claimed is:

1. An electric work machine comprising:
   a motor including:
      a stator and a rotor,
      the stator including:
         a cylindrical body having a first inner circumferential surface;
         a tooth projecting from the first inner circumferential surface; and
         a coil (i) configured to generate a magnetic force in response to receiving an electric power and (ii) wound around the tooth;
   a driver configured (i) for an attachment of an driven member, (ii) to receive a rotational force transmitted from the motor, and (iii) to drive the driven member attached to the driver with the rotational force, and the driven member being configured to operate on a target of operation in response to being driven by the driver;
   a temperature sensor in/on the tooth;
   a connection member; and
   a connector (i) coupled with the connection member, and (ii) configured to be detachable from the connection member, wherein:
   the connector includes a first terminal containing metal; and
   the connection member includes:
      a connection main body including (i) an insulating material and (ii) a surface;
      a patterned wiring (i) on the surface and (ii) electrically coupled with the temperature sensor; and
      a second terminal (i) on the surface, (ii) containing metal, (iii) electrically coupled with the patterned wiring, (iv) in contact with and electrically coupled with the first terminal, and (v) being harder and/or thicker than the patterned wiring.

2. The electric work machine according to claim 1,
   wherein the connection main body includes an integrally-molded member containing the insulating material,
   wherein the insulating material contains resin,
   wherein the second terminal is integral with the connection main body, and
   wherein a part of the second terminal is embedded in the connection main body.

3. The electric work machine according to claim 1,
   wherein the connection member is in/on the stator.

4. The electric work machine according to claim 3,
   wherein the stator includes an insulator containing resin, and
   wherein the connection main body corresponds to a part of the insulator.

5. The electric work machine comprising:
   a stator and a rotor;
      the stator including:
         a cylindrical body having a first inner circumferential surface;
         a tooth (i) projecting from the first inner circumferential surface and ii) including an insulator tooth that contains resin; and
         a coil (i) wound around the tooth and (ii) configured to generate a magnetic force in response to receiving an electric power;
   a driver configured (i) to receive a rotational force transmitted from the motor and (ii) to drive a driven member with the rotational force, the driven member being configured to perform work on a target of operation in response to being driven by the driver;
   a temperature sensor; and
   a conductive track (i) including a first partial conductive track on the insulator tooth and (ii) coupling the temperature sensor to a controller,
   wherein the first partial conductive track is printed on the insulator tooth.

6. The electric work machine according to claim 5, wherein the temperature sensor is in/on the insulator tooth.

7. An electric work machine comprising:
   a motor including:
      a stator and a rotor;
      the stator including:
         a cylindrical body having a first inner circumferential surface;
         a tooth (i) projecting from the first inner circumferential surface and (ii) including an insulator tooth that contains resin; and
         a coil (i) wound around the tooth and (ii) configured to generate a magnetic force in response to receiving an electric power;
   a driver configured (i) to receive a rotational force transmitted from the motor and (ii) to drive a driven member with the rotational force, the driven member being configured to perform work on a target of operation in response to being driven by the driver;
   a temperature sensor; and
   a conductive track (i) including a first partial conductive track on the insulator tooth and (ii) coupling the temperature sensor to a controller,
   wherein the stator includes an insulator tubular body (i) containing resin and (ii) integrated with the cylindrical body, and
   wherein the conductive track includes a second partial conductive track on the insulator tubular body.

8. The electric work machine according to claim 7, wherein the second partial conductive track is printed on the insulator tubular body.

* * * * *